United States Patent
Matsuura et al.

(10) Patent No.: US 9,701,927 B2
(45) Date of Patent: Jul. 11, 2017

(54) CLEANING SOLUTION, CLEANING TOOL, AND CLEANING KIT

(71) Applicant: Sharp Kabushiki Kaisha, Osaka-shi, Osaka (JP)

(72) Inventors: Kyohko Matsuura, Osaka (JP); Yuhsuke Tsuda, Osaka (JP); Hidetsugu Matsukiyo, Osaka (JP); Yuka Utsumi, Osaka (JP); Akiyoshi Fujii, Osaka (JP); Takahiro Nakahara, Osaka (JP); Kiyoshi Minoura, Osaka (JP); Miho Yamada, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/764,199

(22) PCT Filed: Jan. 27, 2014

(86) PCT No.: PCT/JP2014/051646
§ 371 (c)(1),
(2) Date: Jul. 29, 2015

(87) PCT Pub. No.: WO2014/119502
PCT Pub. Date: Aug. 7, 2014

(65) Prior Publication Data
US 2015/0361378 A1  Dec. 17, 2015

(30) Foreign Application Priority Data

Jan. 31, 2013 (JP) .................................. 2013-017727
Apr. 22, 2013 (JP) .................................. 2013-089827

(51) Int. Cl.
*B08B 3/00* (2006.01)
*C11D 3/00* (2006.01)
(Continued)

(52) U.S. Cl.
CPC .............. *C11D 3/0047* (2013.01); *C11D 1/66* (2013.01); *C11D 3/06* (2013.01); *C11D 3/10* (2013.01);
(Continued)

(58) Field of Classification Search
CPC ........... C11D 3/0047; C11D 1/66; C11D 3/06; C11D 3/10; C11D 17/041; G02B 1/118; B08B 1/006; B08B 3/04
(Continued)

(56) References Cited

U.S. PATENT DOCUMENTS 5,534,198 A * 7/1996 Masters ............... C11D 3/3746
510/181
6,750,160 B1    6/2004 Hanaoka et al.
(Continued)

FOREIGN PATENT DOCUMENTS

JP    10-287900 A      10/1998
JP    2000-308860   *  11/2000
(Continued)

OTHER PUBLICATIONS

Official Communication issued in International Patent Application No. PCT/JP2014/051646, mailed on Mar. 4, 2014.

*Primary Examiner* — Duy Deo
*Assistant Examiner* — Maki Angadi
(74) *Attorney, Agent, or Firm* — Keating & Bennett, LLP

(57) ABSTRACT

A cleaning solution is used, in a transparent antireflective structure that has, on one surface thereof, a plurality of convexities formed at a period equal to or shorter than wavelength in a visible light range, and that prevents, at the one surface, reflection of light entering the one surface, to clean a concavity defining a region between adjacent two of the plural convexities, the cleaning solution having a pH of 10.00 or more.

11 Claims, 10 Drawing Sheets

(51) Int. Cl.
*G02B 1/118* (2015.01)
*C11D 17/04* (2006.01)
*C11D 1/66* (2006.01)
*C11D 3/06* (2006.01)
*C11D 3/10* (2006.01)
*C11D 3/30* (2006.01)
*B08B 3/04* (2006.01)
*B08B 1/00* (2006.01)

(52) U.S. Cl.
CPC ............. *C11D 3/30* (2013.01); *C11D 17/041* (2013.01); *C11D 17/049* (2013.01); *G02B 1/118* (2013.01); *B08B 1/006* (2013.01); *B08B 3/04* (2013.01)

(58) Field of Classification Search
USPC ...................................................... 134/18, 26
See application file for complete search history.

(56) References Cited

U.S. PATENT DOCUMENTS 8,252,736 B2 * 8/2012 Brooker ............... C11D 3/1213
134/25.2
2007/0159698 A1 7/2007 Taguchi et al.

FOREIGN PATENT DOCUMENTS

| JP | 2000-308860 A | 11/2000 |
| JP | 2004-149702 A | 5/2004 |
| JP | 2007-008976 A | 1/2007 |
| JP | 2009-526727 A | 7/2009 |
| JP | 2010-116332 A | 5/2010 |
| JP | 4850270 B2 | 1/2012 |
| WO | 2007/093339 A1 | 8/2007 |
| WO | 2012/043004 A1 | 4/2012 |

* cited by examiner

CLEANING SOLUTION, CLEANING TOOL, AND CLEANING KIT

TECHNICAL FIELD

The present invention relates to a cleaning solution, a cleaning tool, and a cleaning kit.

This application claims the priority on the basis of Japanese Patent Application No. 2013-017727 filed in Japan on Jan. 31, 2013 and No. 2013-089827 filed in Japan on Apr. 22, 2013, the entire contents of which are hereby incorporated by reference.

BACKGROUND ART

Hitherto, antireflection techniques have been developed to reduce surface reflection and to increase an amount of transmitted light, and have been employed in various fields including, e.g., display devices used in TVs, cellular phones, etc., and optical elements in camera lenses.

One example of the antireflection techniques is an antireflective member in which fine concave-convex irregularities (constituting an antireflection structure) are formed on an outside-light incident surface of the antireflective member at a period that is controlled to be equal to or shorter than wavelength of visible light (see, e.g., Patent Literature (PTL) 1). In such a configuration, reflection of light entering the antireflective member is suppressed by, on the basis of the principle of the so-called Motheye structure, changing the refractive index in a height direction of the concave-convex irregularities gradually from the refractive index of an incident medium to the refractive index of a substrate.

CITATION LIST

Patent Literature

PTL 1: Japanese Patent No. 4850270

SUMMARY OF INVENTION

Technical Problem

With the antireflection technique described above, because reflectance at a substance interface is reduced by moderating the difference in refractive index at the substance interface with the presence of the concave-convex irregularities having size equal to or shorter than wavelength of visible light, the effect of antireflection reduces if a boundary between different refractive indexes is clarified with stains attached to concavities and convexities. Accordingly, there has been demanded a technique capable of satisfactorily cleaning off stains on the outside-light incident surface of the antireflective member for the purpose of maintaining the function of the antireflective member.

The present invention has been made in view of the above-described situations, and an object of the present invention is to provide a cleaning solution capable of satisfactorily cleaning off stains attached to fine concave-convex irregularities formed at a period that is controlled to be equal to or shorter than wavelength of visible light. Another object of the present invention is to provide a cleaning tool and a cleaning kit each of which contains the cleaning solution and is capable of satisfactorily cleaning off stains attached to fine concave-convex irregularities formed at a period that is controlled to be equal to or shorter than wavelength of visible light.

Solution to Problem

According to one embodiment of the present invention, there is provided a cleaning solution used, in a transparent antireflective structure that has, on one surface thereof, a plurality of convexities formed at a period equal to or shorter than wavelength in a visible light range, and that prevents, at the one surface, reflection of light entering the one surface, to clean a concavity defining a region between adjacent two of the plural convexities, the cleaning solution having a pH of 10.00 or more.

In the one embodiment of the present invention, the cleaning solution may contain a buffer.

In the one embodiment of the present invention, the cleaning solution may contain a surfactant.

In the one embodiment of the present invention, the surfactant may contain a nonionic surfactant, and a concentration of the nonionic surfactant may be 0.1% by mass or more and 10% by mass or less.

In the one embodiment of the present invention, the concentration of the nonionic surfactant may be 1.0% by mass or more and 5.0% by mass or less.

In the one embodiment of the present invention, the surfactant may contain an anionic surfactant.

In the one embodiment of the present invention, the pH may be 13.00 or less.

In the one embodiment of the present invention, the pH may be 11.40 or more and 12.00 or less.

In the one embodiment of the present invention, the pH may be 10.70 or more and 11.10 or less.

In the one embodiment of the present invention, the cleaning solution may be an aqueous solution containing a water-soluble basic substance and water that dissolves the basic substance.

In the one embodiment of the present invention, the convexities may be each a cone with a height of 100 nm or more and 600 nm or less and a width of a bottom surface, when looked at in a plan view, being 100 nm or more and 600 nm or less.

In the one embodiment of the present invention, the antireflective structure may be bonded to a display surface of a display device in a state where the one surface of the antireflective structure is exposed to the outside.

According to another embodiment of the present invention, there is provided a cleaning tool used, in a transparent antireflective structure that has, on one surface thereof, a plurality of convexities formed at a period equal to or shorter than wavelength in a visible light range, and that prevents, at the one surface, reflection of light entering the one surface, to clean a concavity defining a region between adjacent two of the plural convexities, wherein the cleaning tool includes the cleaning solution described above, and a sheet-like base member impregnated with the cleaning solution.

According to still another embodiment of the present invention, there is provided a cleaning tool used, in a transparent antireflective structure that has, on one surface thereof, a plurality of convexities formed at a period equal to or shorter than wavelength in a visible light range, and that prevents, at the one surface, reflection of light entering the one surface, to clean a concavity defining a region between adjacent two of the plural convexities, wherein the cleaning tool includes the cleaning solution described above, and a container including a container body that contains the cleaning solution, and that has an opened portion through which the cleaning solution is discharged, and an application member that covers the opened portion, and that allows the cleaning solution to be discharged therethrough.

According to still another embodiment of the present invention, there is provided a cleaning kit used, in a transparent antireflective structure that has, on one surface thereof, a plurality of convexities formed at a period equal to or shorter than wavelength in a visible light range, and that prevents, at the one surface, reflection of light entering the one surface, to clean a concavity defining a region between adjacent two of the plural convexities, wherein the cleaning kit includes a cleaning tool from which the cleaning solution described above is supplied to a zone where a stain component is attached to the concavity, and a wiping tool to wipe off the stain component.

In the still other embodiment of the present invention, the wiping tool may include a removing solution that contains a polar solvent, and that is applied to the zone where the cleaning solution has been applied, and a wiping member to wipe off the stain component together with the removing solution.

In the still other embodiment of the present invention, the removing solution may be an alcohol aqueous solution that contains alcohol as the polar solvent.

In the still other embodiment of the present invention, the wiping member may be a fiber sheet, and the fiber sheet may include fibers with diameters of 7 μm or less without including fibers with diameters of 20 μm or more.

Advantageous Effects of Invention

According to the present invention, the cleaning solution can be provided which is capable of satisfactorily cleaning off the stains attached to the fine concave-convex irregularities formed at the period that is controlled to be equal to or shorter than the wavelength of visible light. Furthermore, the cleaning tool and the cleaning kit can be provided each of which contains the cleaning solution and is capable of satisfactorily cleaning off the stains attached to the fine concave-convex irregularities formed at the period that is controlled to be equal to or shorter than the wavelength of visible light.

DESCRIPTION OF EMBODIMENTS

[First Embodiment]

A cleaning solution according to a first embodiment of the present invention will be described below with reference to FIGS. 1A to 2B. It is to be noted that, in all the drawings referred to below, dimensions and proportions in relative sizes of individual components are changed as appropriate for easier understanding of the drawings. An antireflection structure that is an object to be cleaned by the cleaning solution according to this embodiment is first described, and the cleaning solution suitable for cleaning such an antireflection structure is then described.

(Antireflection Structure)

Figure 1A:
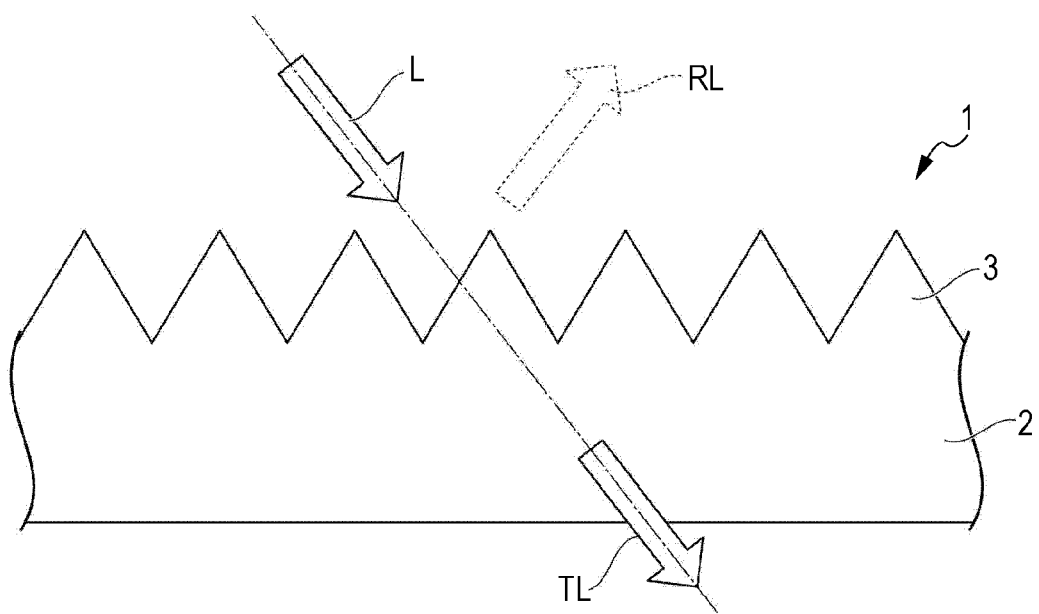
FIG. 1A is an explanatory view of an antireflection structure that is an object to be cleaned by a cleaning solution according to a first embodiment of the present invention, the view being a schematic sectional view of an antireflective member.
Figure 1B:
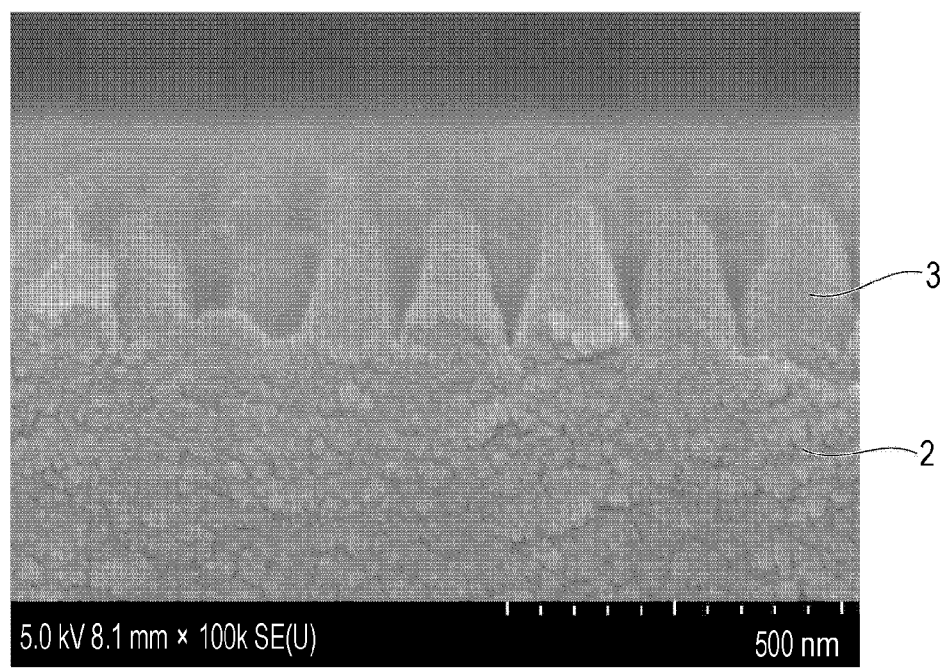
FIG. 1B is an explanatory view of the antireflection structure that is the object to be cleaned by the cleaning solution according to the first embodiment of the present invention, the view being an electron microscope photograph representing, by way of example, a surface of the antireflective member.

FIGS. 1A and 1B are each an explanatory view of the antireflection structure that is the object to be cleaned by the cleaning solution according to the first embodiment of the present invention. In other words, FIGS. 1A and 1B are each an explanatory view of an antireflective member that is a sheet-like member having the antireflection structure and being bonded in use, and that prevents reflection of light at a surface to which the antireflective member is bonded. FIG. 1A is a schematic sectional view of the antireflective member, and FIG. 1B is an electron microscope photograph representing, by way of example, the surface of the antireflective member.

As illustrated in FIG. 1A, the antireflective member 1 is a transparent member including a substrate 2 and a plurality of convexities 3 formed on one surface of the substrate 2.

The antireflective member 1 is made of a material having optical transparency. The material of the antireflective member 1 may be an organic material or an inorganic material insofar as the material can be formed into a desired shape. The antireflective member 1 is preferably produced, for example, by the so-called nanoprinting technique of coating an ultraviolet-curing resin material over the surface of a mold that has a shape corresponding to the shape of the antireflective member 1, applying an ultraviolet ray to the coated resin material for curing, and transferring the shape of the mold to the resin material. In that case, an ultraviolet-curing acrylic resin can be suitably used as the material of the antireflective member 1.

The plural convexities 3 are formed on one surface of the substrate 2 at a period equal to or shorter than wavelength in a visible light range.

Concave-convex irregularities formed by the plural convexities 3 correspond to the "antireflection structure" in the present invention. In the antireflective member 1 including the convexities 3 formed thereon, when light enters the surface (one surface) of the antireflective member 1 on which the convexities 3 are formed, the light is diffracted. However, by setting the period of the convexities 3 equal to or shorter than the wavelength in a visible light range, it is possible to reduce reflection diffraction and transmission diffraction of lights at the orders of diffraction having absolute values of one or more (i.e., ±1-order light, ±2-order light, etc.), and to selectively generate 0-order light (straightforward light).

Given that a direction of each convexity 3 apart away from the substrate 2 is defined as a "height direction", a length of the convexity 3 in the height direction is defined as a "height", a spreading direction (planar direction) of the substrate 2 is defined as a "width direction", and a length of the convexity 3 in the width direction is defined as a "width", the width of the convexity 3 gradually decreases in the height direction. The convexity 3 satisfying such a condition is, e.g., a cone. For example, the convexity 3 is preferably a cone with a height of 100 nm or more and 600 nm or less and a maximum value of the width of the bottom surface, when looked at in a plan view, being 100 nm or more and 600 nm or less.

The "maximum value of the width of the bottom surface, when looked at in a plan view" indicates a value taken when, supposing two parallel lines tangent to the bottom surface in sandwiching relation when looking at the convexity 3 in a plan view, a distance between the parallel lines (i.e., the width of the bottom surface) is maximized. That value corresponds to, for example, a diameter of the bottom surface when the convexity 3 has a circular conical shape, and to a length of the diagonal of the bottom surface when the convexity 3 is a tetragonal pyramid (i.e., a quadrangular pyramid having a square bottom surface).

With the configuration described above, in a columnar solid (hereinafter referred to as a "virtual column") that is surrounded by the bottom surface of the convexity 3, a surface drawn by all of linear lines passing individual points at an edge of the bottom surface and being perpendicular to the bottom surface, and a plane located at the same level as the highest position of the convexity 3 and being parallel to the bottom surface, a volume ratio of the convexity 3 to a space (air) other than the convexity 3 changes depending on a position in the height direction. Accordingly, the refractive index of the virtual column changes in the height direction.

As a result, the antireflective member 1 can prevent reflection (generation of reflected light RL) that degrades viewability, and can selectively generate a transmitted light TL with respect to incident light L in a wide wavelength range.

In the antireflective member 1 having the above-mentioned configuration, the reflection of the incident light is prevented on the basis of the change in the refractive index of the virtual column as described above. Therefore, if stains are attached to the surroundings of the convexities 3 and a boundary of the refractive index between two substances appears, a difficulty arises in obtaining the designed characteristics. Accordingly, when the surface (one surface) of the antireflective member 1 on which the convexities 3 are formed is stained, it is required, for the purpose of maintaining the performance, to clean the stained surface, and to remove a substance causing the staining.

Figure 2A:
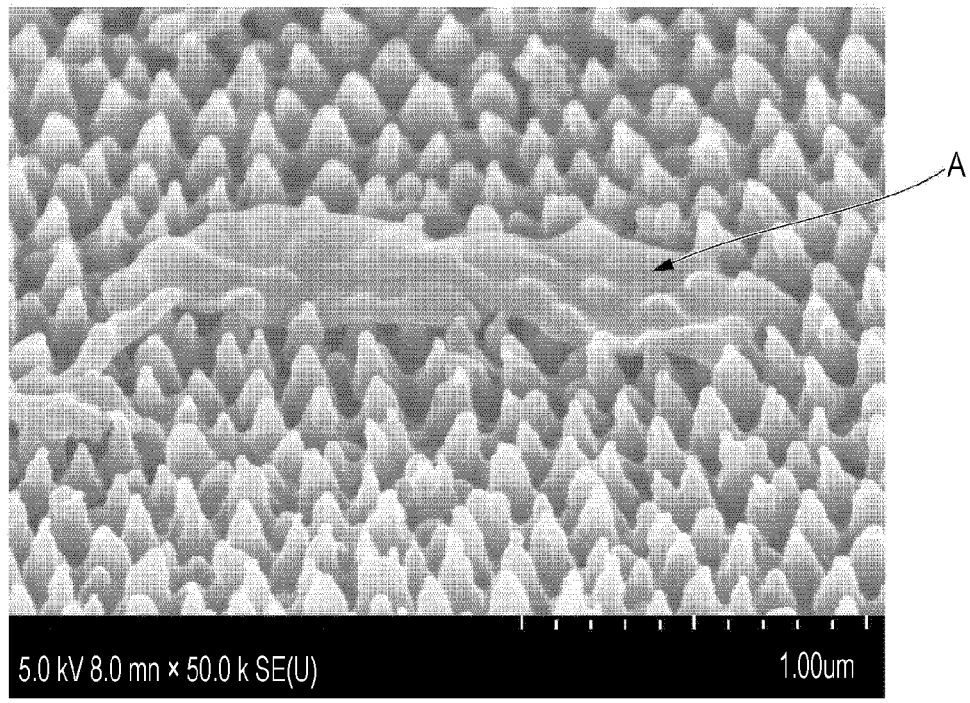
FIG. 2A is an electron microscope photograph representing a stain attached onto the antireflection structure.
Figure 2B:
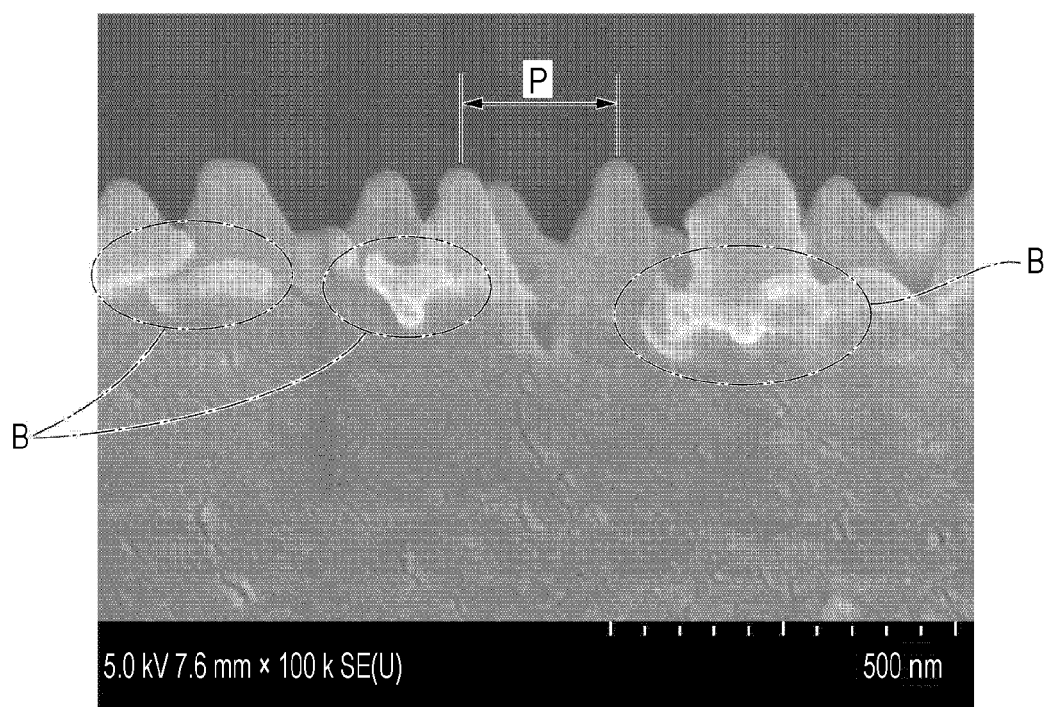
FIG. 2B is an electron microscope photograph representing a stain attached onto the antireflection structure.

FIGS. 2A and 2B are each an electron microscope photograph representing a stain attached onto the antireflection structure of the antireflective member.

First, FIG. 2A is an enlarged photograph representing a stain attached to a surface of the antireflection structure. FIG. 2A depicts, as one example of stains, a sebum stain attached when a person touches, with a bare hand, the surface of the antireflection structure where the plural convexities are formed.

As seen from the drawing, the sebum stain denoted by A in the drawing is attached in the form of a film covering the tops of the plural convexities 3. It is deemed that, when staining is caused by a stain attached to the surface of the antireflection structure like the sebum stain, the staining can be removed by wiping over the surface of the antireflection structure.

On the other hand, FIG. 2B is an enlarged photograph representing a stain attached to a region (hereinafter referred to as a "concavity") between the convexities adjacent to each other in the antireflection structure. More specifically, FIG. 2B is a photograph representing, in section, a stain caused by saliva that has been scattered to separate positions and dried there on the surface of the antireflection structure where the plural convexities are formed.

In the drawing, the saliva stain denoted by B and surrounded by a broken line is attached in the deepest portion of the concavity. Furthermore, in the antireflection structure, the period at which the convexities are formed, namely the width of the concavity, is equal to or shorter than the wavelength in a visible light range. In the antireflection structure illustrated in FIG. 2B, the period P is about 200 nm.

Therefore, even when trying to remove the stain in the concavity, illustrated in FIG. 2B, by cleaning the antireflection structure with a cleaning solution, which is usually employed to clean display surfaces of display devices used in, e.g., TVs and cellular phones, showcases, shop windows, and so on, as in the case of cleaning off the stain illustrated in FIG. 2A, the cleaning cannot be performed effectively. The reason is that, even with silk generally called an ultrathin fiber and having a fiber diameter of about 2 µm, the fiber is too fat in comparison with the width of the concavity. Thus, the fiber cannot be brought into the concavity, and the stain cannot be removed through physical contact with the stain.

Moreover, studies conducted by the inventors have proved that it is also difficult to remove the stain in the concavity, such as illustrated in FIG. 2B, by employing a popular natural detergent or alcohol.

As a result of conducting studies on the cleaning solution according to this embodiment with attention focused on pH, the inventors have found that the concavity can be satisfactorily cleaned by setting a pH of the cleaning solution to 10.00 or more. The cleaning solution according to this embodiment will be described below.

(Cleaning Solution)

The cleaning solution according to this embodiment is a cleaning solution that is used to clean the concavities of the above-described antireflection structure, and that has a pH of 10.00 or more.

In the cleaning solution with the pH in the above-mentioned range, since a hydroxide ion ($OH^-$) has a size smaller than the width of the concavity, the hydroxide ion easily enters the concavity and partly decomposes a stain. Thus, satisfactory removal of the stain can be realized, and satisfactory cleaning can be obtained.

From the viewpoint of preventing deterioration of the convexities constituting the antireflection structure, the pH of the cleaning solution is preferably 13.00 or less. From the viewpoint of realizing a high cleaning effect and suppressing the deterioration of the convexities constituting the antireflection structure at the same time, the pH of the cleaning solution is more preferably 11.40 or more and 12.00 or less.

As an alternative, it is also preferable that the pH of the cleaning solution is set to 10.70 or more and 11.10 or less. When the pH is 10.70 or more, the cleaning effect is high. When the pH is 11.10 or less, deterioration of the resin component constituting the antireflection structure can be suppressed.

In the cleaning solution, an organic solvent, such as alcohol, may be used as a solvent. For the reason that water is easy to handle, however, it is preferable to use water as the solvent, and to prepare an aqueous solution containing a water-soluble basic substance and water to dissolve the basic substance.

Commonly known organic salts or inorganic salts can be optionally used as the basic substance. Examples of those salts include alkali metal hydroxides such as sodium hydroxide and potassium hydroxide, carbonates such as sodium carbonate, sodium percarbonate, potassium carbonate, and sodium sesquicarbonate, sodium phosphate, silicates such as sodium silicate, sodium metasilicate, sodium orthosilicate, potassium silicate, potassium metasilicate, potassium orthosilicate, and other salts such as sodium methylglycine acetate, sodium hydrochlorite, and sodium phosphate.

Moreover, alkanolamine, such as methanol amine or methanol amine, can also be used as the basic substance.

The above-mentioned substances may be used solely or in combination of two or more.

The cleaning solution is preferably a buffer solution containing a buffer. Because the cleaning solution according to this embodiment is alkaline, there is a possibility that the cleaning solution may absorb carbon dioxide in air and may reduce the pH. With the cleaning solution containing the buffer, however, such change of the pH can be suppressed. Commonly known buffers can be optionally used as the buffer depending on the set pH of the cleaning solution. Preferably, the cleaning solution contains some of common known buffer solutions, such as the Sørensen buffer solution and the Kolthoff buffer solution.

Moreover, a viscosity adjuster for adjusting viscosity may be optionally added to the cleaning solution in order to prevent dripping of the solution.

In addition, a surfactant, an organic solvent, a perfume, etc. may be further added to the cleaning solution to such an extent as far as the advantageous effects of the present invention are not impaired.

A nonionic surfactant or an anionic surfactant may be used as the surfactant. With addition of the surfactant to the cleaning solution, the cleaning effect can be increased.

Examples of the nonionic surfactant usable here include an ethylene oxide-propylene oxide block copolymer, polyoxyethylene alkyl ether, polyoxyethylene alkyl phenyl ether, higher fatty acid alkanol amide, polyoxypropylene alkyl ether, polyoxyalkylene alkyl ether, sucrose fatty acid ester, higher fatty acid alkanol amide, and tertiary amine oxide.

The concentration of the nonionic surfactant is preferably 0.1% by mass or more and 10% by mass or less, and more preferably 1.0% by mass or more and 5.0% by mass or less. When the concentration of the nonionic surfactant is 0.1% by mass or more, detergency of the cleaning solution is high, and stains can be sufficiently wiped off. When the concentration of the nonionic surfactant is 10% by mass or less, bubbling of the cleaning solution is suppressed, and the stain is less likely to attach during the wiping.

Examples of the anionic surfactant usable here include alkyl benzene sulfonate, alkyl sulfate ester salt, alkyl ethoxy sulfate ester, olefin sulfonate, fatty acid salt, alkyl ethoxy carboxylate, α-sulfo fatty acid ester salt, α-sulfo fatty acid salt, monoalkyl phosphoric-acid phosphoric acid ester salt, and sodium dodecyl sulfate.

The nonionic surfactant and the anionic surfactant may be each used solely or in combination of two or more.

Furthermore, the cleaning solution preferably contains salt acting to suppress activity of multivalent metal ions to such an extent as far as the advantageous effects of the present invention are not impaired. Adding such salt is effective in preventing corrosion of aluminum and alumite that are used in frames of liquid crystal TVs, window frames, picture frames, etc. Examples of the above-mentioned salt include phosphates and silicates, which can be each used solely or in a mixed state of two or more.

The cleaning solution described above can be obtained as a cleaning solution capable of satisfactorily cleaning off stains attached to the fine concave-convex irregularities formed at the period that is controlled to be equal to or shorter than the wavelength of visible light.

When the cleaning solution is applied to a stained region of the antireflection structure, the cleaning solution is able to permeate into the concavities of the antireflection structure and to clean the concavities. After being applied for the cleaning, the cleaning solution is preferably wiped off together with the stains by employing a piece of cloth, for example. Preferably, a removing solution (described later) for removing the cleaning solution is separately prepared and, after wiping off the cleaning solution, the region to which the cleaning solution has been applied is further wiped with application of the removing solution to prevent the cleaning solution from remaining there.

In the cleaning using the cleaning solution, it is preferable that, for the purpose of ensuring a time during which the cleaning solution permeates into the deepest portions of the concavities of the antireflection structure, the cleaning solution is wiped off after leaving the applied region to stand for, e.g., about 5 minutes after the application of the cleaning solution, without wiping off the cleaning solution immediately after the application of the cleaning solution. As a result, the effect of the cleaning using the cleaning solution can be increased.

The cleaning is preferably performed at temperature higher than a room temperature, and a suitable temperature is about 40° C. For example, it is preferable to perform the cleaning by employing the cleaning solution that has been heated to about 40° C. in advance. When the antireflection structure is formed on display surfaces of display devices used in, e.g., TVs and cellular phones, the antireflection structure is heated with heating upon operation of the display device. Therefore, cleaning of the antireflection structure in the display device is preferably performed during a period in which the display surface is heated and is at temperature higher than the room temperature such as during the operation or immediately after stop of the operation.

When the antireflection structure is formed on display surfaces of display devices used in, e.g., TVs and cellular phones, showcases, shop windows, and so on, the antireflection structure may be stained and the antireflection effect may be reduced in some cases. By applying the cleaning solution to a stained region of the antireflection structure and cleaning the stained region, however, the stain can be properly removed, and the antireflection effect can be maintained. Furthermore, when the surface of the antireflection structure is stained during storage or transport of a structured member having the antireflection structure such as the above-mentioned antireflective member, the antireflection structure can also be cleaned with the cleaning solution according to this embodiment.

For example, when the antireflective member is bonded to a display surface of a display device in a process of manufacturing the display device that includes the antireflection structure formed on the display surface, a high-quality display device in which reflection at its display surface is suppressed can be manufactured by cleaning the antireflective member before the bonding or the antireflective member after the bonding with the cleaning solution according to this embodiment.

(Cleaning Tool)

A cleaning tool according to this embodiment includes the above-described cleaning solution, and a sheet-like base member impregnated with the cleaning solution.

Alternatively, the cleaning tool according to this embodiment includes the above-described cleaning solution, a container body that contains the cleaning solution, and that has an opened portion through which the cleaning solution is discharged, and an application member that covers the opened portion, and that allows the cleaning solution to be discharged therethrough.

Those cleaning tools will be described in detail in a second embodiment and thereafter.

The cleaning tool mentioned above is capable of satisfactorily cleaning off stains attached to the fine concave-convex irregularities formed at the period that is controlled to be equal to or shorter than the wavelength of visible light.

(Cleaning Kit)

A cleaning kit according to this embodiment includes a cleaning tool that supplies the above-described cleaning solution, and a wiping tool to wipe off a stain component that is attached to the antireflection structure.

The cleaning tool may be one of cleaning tools described in detail in the second embodiment thereafter. As an alternative, the cleaning tool may be practiced in such a manner that the cleaning solution is stored in a container, and that a user supplies the cleaning solution from the container to the desired region by employing a piece of cloth or the like.

The wiping tool may include, for example, a removing solution that contains a polar solvent, and that is applied to a region where the cleaning solution has been applied, and a wiping member to wipe off the stain component together with the removing solution. The removing solution and the wiping member will be described later.

The cleaning kit described above is capable of satisfactorily cleaning off stains attached to the fine concave-convex irregularities formed at the period that is controlled to be equal to or shorter than the wavelength of visible light.

[Second Embodiment]

Figure 3A:
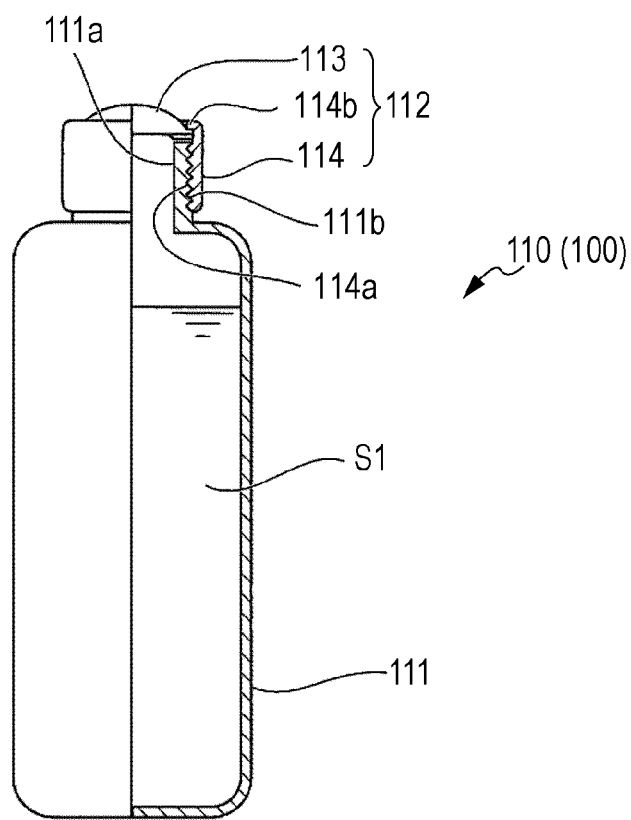
FIG. 3A illustrates, in a partially sectioned way, a first container of a cleaning tool according to a second embodiment of the present invention.
Figure 3B:
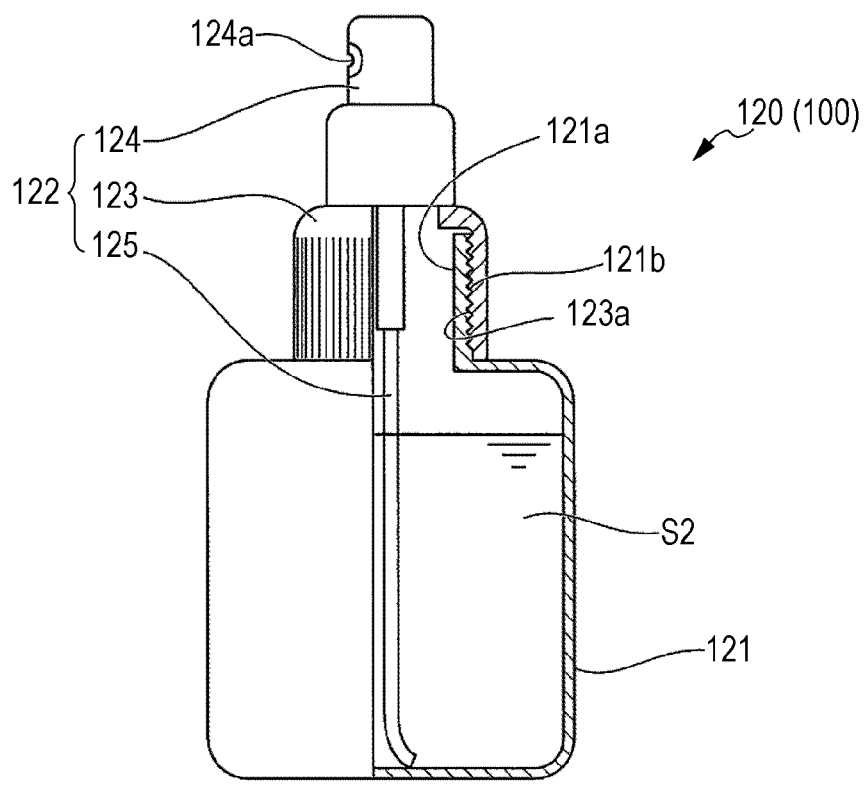
FIG. 3B illustrates, in a partially sectioned way, a second container of the cleaning tool according to the second embodiment of the present invention.

FIGS. 3A and 3B are each a schematic view of a cleaning tool according to a second embodiment of the present invention. A cleaning tool 100 according to this embodiment includes a first container 110 that contains the above-described cleaning solution S1 according to the present invention, and a second container 120 that contains a removing solution S2 to remove the cleaning solution S1. FIG. 3A illustrates, in a partially sectioned way, the first container 110, and FIG. 3B illustrates, in a partially sectioned way, the second container 120.

As illustrated in FIG. 3A, the first container 110 includes a cylindrical container body 111 equipped with a bottom, which contains the cleaning solution S1, and which has an opened portion 111a through which the cleaning solution S1 is discharged, and an application member 112 that covers the opened portion 111a, and that allows passage and discharge of the cleaning solution S1 therethrough.

The application member 112 includes an applying portion 113 that allows passage of the cleaning solution S1 therethrough, and a holder 114 that holds the applying portion 113 to the container body 111. Male threads 111b are formed at the outer side of the opened portion 111a of the container body 111, and female threads 114a are formed at the inner side of the holder 114. The holder 114 is screwed to the opened portion 111a of the container body.

The holder 114 includes a holding portion 114b formed at one side and protruding to come closer to a center axis than the other side, and the applying portion 113 is held by the holding portion 114b. The applying portion 113 may be bonded to the holding portion 114b, or may be fixedly held in such a way that a peripheral edge of the applying portion 113 is sandwiched between the holding portion 114b and an end portion of the container body 111.

The container body 111 may be made of an organic material (resin material) or an inorganic material insofar as the material is not deteriorated by the alkaline cleaning solution S1. The container body 111 may be optically transparent or opaque. However, the container body 111 preferably has optical transparency to such an extent as enabling an amount of the cleaning solution S1 remaining in the interior to be confirmed.

The organic material may be optionally selected from commonly known various resin materials as insofar as the resin material has alkali resistance. For example, glass may be used as the inorganic material.

The applying portion 113 is formed by employing a resin-made porous material having many pores intercommunicating therein, such as a sponge-like material or a laminate of nonwoven fabric. A region of the applying portion 113 sandwiched between the container body 111 and the holder 114 is preferably finished, as required, with water-proofing to prevent passage of the cleaning solution S1 therethrough.

The first container 110 further includes a not-illustrated lid that covers the applying portion 113, and that prevents drying of the applying portion 113.

In the first container 110 constituted as described above, when the first container 110 is turned over into a state where the applying portion 113 faces downward, the cleaning solution S1 in the container body 111 permeates into the applying portion 113. With the first container 110, the user can apply the cleaning solution S1, without touching the alkaline cleaning solution S1, by bringing the applying portion 113 into contact with an application target surface, i.e., a stained region of the antireflection structure.

As illustrated in FIG. 3B, the second container 120 includes a container body 121 that contains the removing solution S2, and that has an opened portion 121a through which the removing solution S2 is discharged, and an application member 122 that covers the opened portion 121a, and that allows passage and discharge of the removing solution S2 therethrough.

The application member 122 includes a cap 123 that is disposed over the opened portion 121a of the container body 121, a spray head 124 that is disposed at an upper end of the cap, and an inner tube 125 that is connected to the spray head 124, and that has a distal end immersed in the removing solution S2 stored within the container body 121. Male threads 121b are formed at the outer side of the opened portion 121a of the container body 121, and female threads 123a are formed at the inner side of the cap 123. The cap 123 is screwed to the opened portion 121a of the container body.

The spray head 124 may be of the commonly known type of spraying the removing solution S2 through a nozzle 124a upon an upper end of the spray head 124 being depressed, and sucking up the removing solution S2 into the inner tube 125 upon rising of the spray head 124 after having been depressed.

A polar solvent can be used as the removing solution S2. For example, pure water, alcohols such as ethanol, propanol, and isopropyl alcohol, acetone, and a mixture of two or more among them can be optionally used. Above all, an alcohol aqueous solution is preferably used as the removing solution S2.

The second container 120 further includes a not-illustrated lid that covers the spray head 124, and that prevents drying of the nozzle 124a.

The cleaning tool 100 may further include a dedicated wiping member used to wipe off the cleaning solution S1 and the removing solution S2. As the wiping member, a piece of cloth (fiber sheet) woven with ultrathin fibers can be suitably used in order that the fine convexities of the antireflection structure will not be damaged when wiping off the cleaning solution S1 and the removing solution S2.

The fiber sheet may be made of woven fabric or nonwoven fabric. The ultrathin fibers preferably include fibers having diameters of 7 μm or less without including fibers having diameters of 20 μm or more.

Practical examples of the ultrathin fibers are "Belima X", "Savina MX", and "Savina CK" made by KB SEIREN, LTD., "Nanocloth" made by TEIJIN FIBERS LIMITED, and "TRAYSEE" made by TORAY INDUSTRIES INC.

According to the cleaning tool 100 constituted as described above, the user can first clean the antireflection structure by applying the cleaning solution S1 to the application target surface, i.e., the stained region of the antireflection structure, and by wiping off the cleaning solution S1 with use of the first container 110. Then, by spraying the removing solution S2 to the region where the cleaning solution S1 has been applied, or a wider region including the region where the cleaning solution S1 has been applied, and by wiping off the removing solution S2, it is possible to avoid the cleaning solution S1 from remaining on the antireflection structure, and to suppress deterioration of the antireflection structure, which may be caused by the cleaning solution S1.

[Third Embodiment]

Figure 4A:
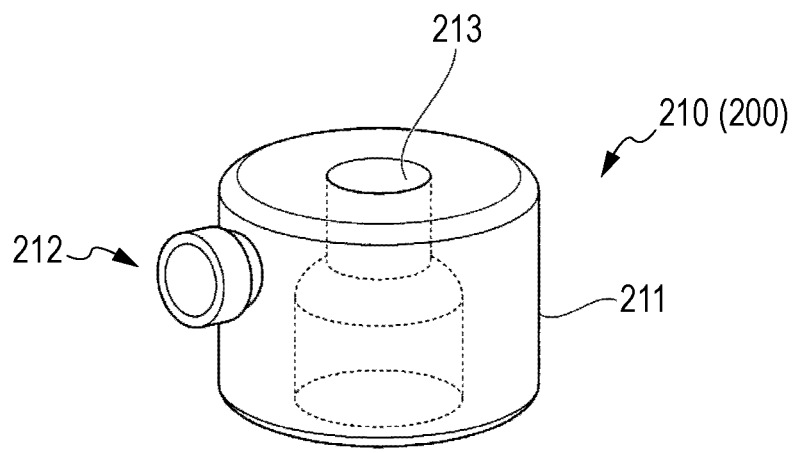
FIG. 4A is a schematic perspective view of a first container of a cleaning tool according to a third embodiment of the present invention.
Figure 4B:
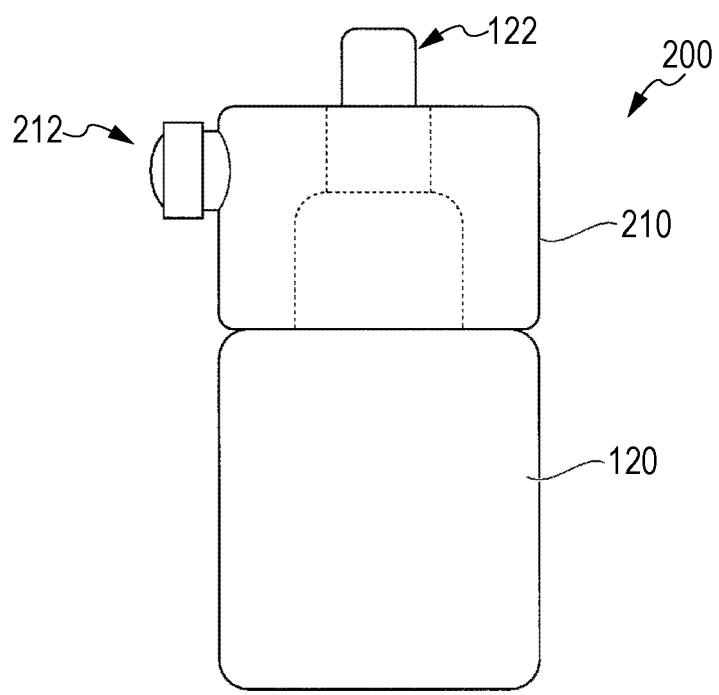
FIG. 4B is a schematic view of the cleaning tool according to the third embodiment of the present invention.

FIGS. 4A and 4B are each a schematic view of a cleaning tool according to a third embodiment of the present invention. A cleaning tool 200 according to the third embodiment is partly in common to the cleaning tool 100 according to the second embodiment, and it is different from the latter in the shape of the container body of the first container that contains the cleaning solution S1. Hence constituent elements in the third embodiment, which are in common to those in the second embodiment, are denoted by the same reference symbols, and detailed description of those constituent elements is omitted.

Similarly, in other embodiments described below, constituent elements in common to those in the above embodiments are also denoted by the same reference symbols, and detailed description of those constituent elements is omitted.

FIG. 4A is a schematic perspective view of a first container 210 in the cleaning tool 200 according to this embodiment, and FIG. 4B is a schematic view of the cleaning tool 200 according to this embodiment.

As illustrated in FIG. 4A, the first container 210 includes a container body 211 that contains the cleaning solution, and that has an opened portion through which the cleaning solution is discharged, and an application member 212 that covers the opened portion, and that allows passage and discharge of the cleaning solution therethrough.

In the container body 211, the application member 212 is disposed on a lateral surface of the container body 211, and a penetration hole 213 is formed in the container body 211 near a center when looked at in a plan view. The penetration bore 213 illustrated in the drawing has a shape defined by two cylinders that have different diameters, and that are communicated with each other in a state where the upper cylinder has the smaller diameter.

As illustrated in FIG. 4B, in the cleaning tool 200, the second container 120 can be fitted to the penetration bore 213 of the first container 210 such that both the containers can be integrated into one unit. Thus, when the cleaning tool 200 is displayed on the shelves or is stored after being used, the cleaning tool can be arranged in a place of a relatively small area.

Female threads and male threads may be provided at the inner side of the penetration bore 213 and at the outer side of the second container 120 in a position facing the penetration bore 213, respectively, such that the first container 210 and the second container 120 are screwed to each other.

Alternatively, a recess or a projection may be provided at the inner side of the penetration hole 213, and a projection or a recess capable of being engaged with the recess or the projection, which is provided at the inner side of the penetration hole 213, may be provided at the outer side of the second container 120 in a position facing the penetration hole 213 such that the first container 210 and the second container 120 are fixedly held by engaging those recesses and projections with each other.

With the cleaning tool 200 constituted as described above, the user can satisfactorily clean the antireflection structure while ensuring that the cleaning solution S1 can be suppressed from remaining on the antireflection structure. Moreover, the first container 210 and the second container 120 can be stored together even in a relatively small storage place.

[Fourth Embodiment]

Figure 5:
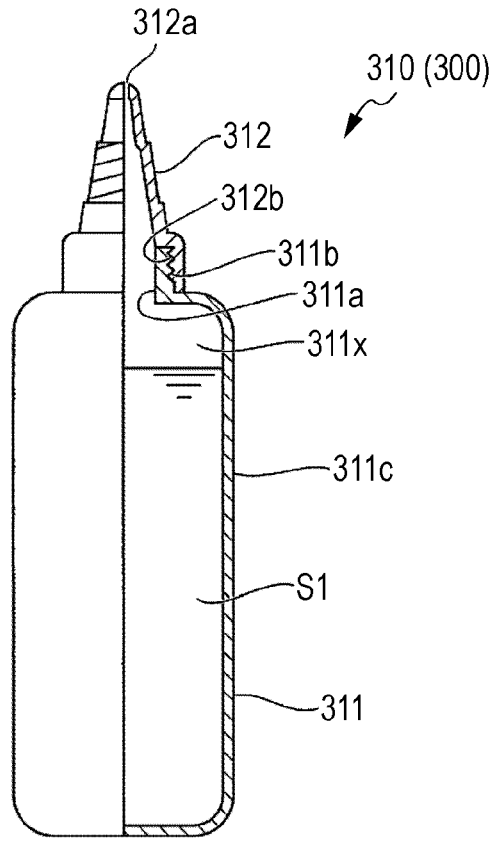
FIG. 5 is a schematic view of a cleaning tool according to a fourth embodiment of the present invention.

FIG. 5 is a schematic view of a cleaning tool according to a fourth embodiment of the present invention. In other words, FIG. 5 illustrates, in a partially sectioned way, a first container 310 of a cleaning tool 300 according to this embodiment. The cleaning tool 300 according to the fourth embodiment is partly in common to the cleaning tool according to the second embodiment, and it is different from the latter in the shape of the application member of the first container that contains the cleaning solution. The second container 120 illustrated in the second embodiment can be used as a second container of the cleaning tool 300.

As illustrated in FIG. 5, the first container 310 includes a container body 311 that contains the cleaning solution S1, and that has an opened portion 311a through which the cleaning solution S1 is discharged, and an application member 312 that covers the opened portion 311a, and that allows passage and discharge of the cleaning solution S1 therethrough.

The application member 312 is a tubular member having a width gradually reducing toward the side opposite to the container body 311, and including a discharge port 312a at a distal end. The application member 312 preferably includes therein a mechanism for preventing the solution from dripping through the discharge port 312a when the first container 310 is held in a state where the application member 312 faces downward.

Female threads 312b are formed at the inner side of the application member 312 in a region close to the container body 311, and are screwed to male threads 311b that are formed at the outer side of the opened portion 311a of the container body 311.

The container body 311 is made of an organic material (resin material) and is deformed to be able to pressurize an inner space 311x upon a lateral portion 311c being pressed.

The first container 310 further includes a not-illustrated lid that covers the application member 312, and that prevents evaporation of the cleaning solution S1.

With the cleaning tool 300 constituted as described above, by pressing the container body 311 with the application member 312 facing downwards, the user can discharge the cleaning solution S1 in the container body 311 through the discharge port 312a to be contacted with the application target surface, i.e., the stained region of the antireflection structure (namely, the user can apply the cleaning solution S1). As a result, the antireflection structure can be cleaned.

[Fifth Embodiment]

Figure 6:
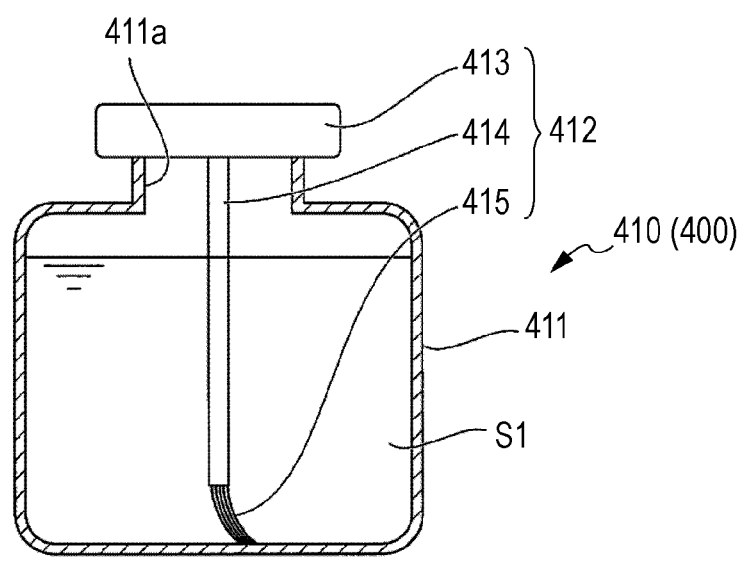
FIG. 6 is a schematic view of a cleaning tool according to a fifth embodiment of the present invention.

FIG. 6 is a schematic view of a cleaning tool according to a fifth embodiment of the present invention. In other words, FIG. 6 illustrates, in a partially sectioned way, a first container 410 of a cleaning tool 400 according to this embodiment. The cleaning tool 400 according to the fifth embodiment is partly in common to the cleaning tool according to the second embodiment, and it is different from the latter in the shape of the first container that contains the cleaning solution. The second container 120 illustrated in the second embodiment can be used as a second container of the cleaning tool 400.

The first container 410 includes a cylindrical container body 411 equipped with a bottom, which contains the cleaning solution S1, and an application member 412 that covers an opened portion 411a provided in the container body 411, and that is removably attached.

The application member 412 includes a cap 413 that covers the opened portion 411a, and that is removably attached, a shaft portion 414 that projects toward a bottom of the container body 411 from the cap 413 attached to the opened portion 411a, and a brush-like applying portion 415 that is disposed at a distal end of the shaft portion 414.

The cap 413 is fixedly screwed by cooperation of not-illustrated male threads formed at the outer side of the opened portion 411a of the container body 411 and not-illustrated female threads formed at the inner side of the cap 413. Thus, the application member 412 is removed away from the opened portion 411a when it is rotated in one direction about a rotation axis set along the shaft portion 414, and is attached to be held in a state covering the opened portion 411a when rotated in the other direction.

With the cleaning tool 400 constituted as described above, the user can clean the antireflection structure by applying the cleaning solution S1, which is impregnated in the applying portion 415, to the application target surface, i.e., the stained region of the antireflection structure, and by wiping off the cleaning solution as appropriate.

[Sixth Embodiment]

Figure 7:
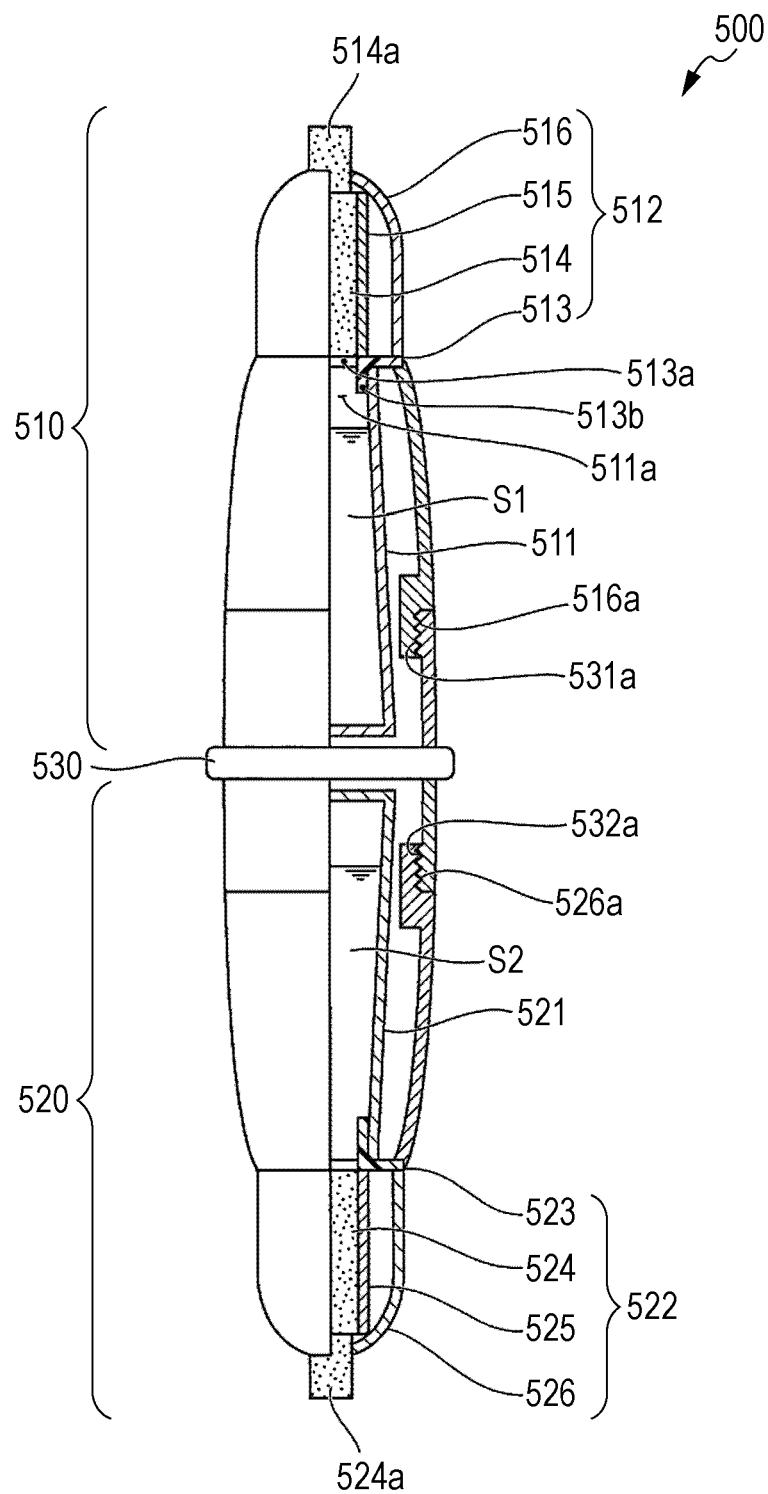
FIG. 7 illustrates, in a partially sectioned way, a cleaning tool according to a sixth embodiment of the present invention.

FIG. 7 illustrates, in a partially sectioned way, a cleaning tool 500 according to a sixth embodiment of the present invention. As illustrated in the drawing, the cleaning tool 500 according to this embodiment includes a first container 510 that contains the cleaning solution S1, and that allows the cleaning solution S1 to be applied to the desired position therefrom, and a second container 520 that contains the removing solution S2, and that allows the removing solution S2 to be applied to the desired position therefrom, the first container 510 and the second container 520 being coupled integrally with each other through a coupling member 530.

The first container 510 includes a cartridge (container body) 511 that contains the cleaning solution S1, and an application member 512 that is connected to the cartridge 511, and that allows passage and discharge of the cleaning solution S1 therethrough from the interior of the cartridge 511. In a connected portion between the cartridge 511 and the application member 512, an opened portion 511a through which the cleaning solution S1 is discharged is formed in the cartridge 511.

The application member 512 includes a connection member 513 to which the cartridge 511 is connected, an applying portion 514 that is disposed at one side of the connection member 513 opposite to the other side where the cartridge 511 is connected to the connection member 513, a protective member 515 that covers the surroundings of the applying portion 514, and a cylindrical casing 516 that contains the above-mentioned components.

The connection member 513 is a plate-like member having a penetration bore 513a formed therein, and a protrusion 513b protruding toward the cartridge 511 around the penetration bore 513a. At the connection member 513, the protrusion 513b is inserted to the interior of the opened portion 511a of the cartridge 511, whereby the cartridge 511 and the connection member 513 are connected to each other. The cleaning solution S1 inside the cartridge 511 is supplied to the applying portion 514 through the penetration bore 513a.

The applying portion 514 is a columnar member formed by employing a resin-made porous material having many pores intercommunicating therein, such as a sponge-like material or a laminate of nonwoven fabric. One end of the applying portion 514 is connected to the connection member 513. The other end of the applying portion 514, constituting a tip 514a, is exposed to the outside of the cleaning tool 500, and it forms a pen tip. The cleaning solution S1 supplied to the applying portion 514 is impregnated into the applying portion 514 and is applied to the application target surface, i.e., the stained region of the antireflection structure, upon the tip 514a being touched to the stained region.

The protective member 515 is a member that covers a lateral surface of the applying portion 514, and that prevents contact of the cleaning solution S1 against the casing 516 and drying of the applying portion 514 attributable to evaporation of the cleaning solution S1.

Male threads 516a are formed at the outer side of an end portion of the casing 516 on the side closer to the coupling member 530, and are screwed to female threads 531a formed in the coupling member 530. When the cleaning solution S1 inside the cartridge 511 is exhausted, the cartridge 511 can be replaced by loosening the screwed engagement between the casing 516 and the coupling member 530, and by removing the first container 510.

The second container 520 includes a cartridge 521 that contains the removing solution S2, and an application member 522 that is connected to the cartridge 521, and that allows passage and discharge of the removing solution S2 therethrough from the interior of the cartridge 521. In a connected portion between the cartridge 521 and the application member 522, an opened portion 521a through which the removing solution S2 is discharged is formed in the cartridge 521.

The application member 522 includes a connection member 523 to which the cartridge 521 is connected, an applying portion 524 that is disposed at one side of the connection member 523 opposite to the other side where the cartridge 521 is connected to the connection member 523, a protective member 525 that covers the surroundings of the applying portion 524, and a cylindrical casing 526 that contains the above-mentioned components.

The connection member 523 is a plate-like member having a penetration bore 523a formed therein, and a protrusion 523b protruding toward the cartridge 521 around the penetration bore 523a. At the connection member 523, the cartridge 521 and the connection member 523 are connected to each other in a similar manner to that in the above-described connection member 513. The removing solution S2 inside the cartridge 521 is supplied to the applying portion 524 through the penetration bore 523a.

The applying portion 524 is a columnar member formed by employing a similar material to that of the applying portion 514. One end of the applying portion 524 is connected to the connection member 523. The other end of the applying portion 524, constituting a tip 524a, is exposed to the outside of the cleaning tool 500, and it forms a pen tip. The removing solution S2 supplied to the applying portion 524 is impregnated into the applying portion 524 and is applied to the desired position upon the tip 524a being touched to there.

The protective member 525 is a member that covers a lateral surface of the applying portion 524, and that prevents contact of the cleaning solution S1 against the casing 526 and drying of the applying portion 524 attributable to evaporation of the cleaning solution S1.

Male threads 526a are formed at the outer side of an end portion of the casing 526 on the side closer to the coupling member 530, and are screwed to female threads 531a formed in the coupling member 530. The cartridge 521 can be replaced by loosening the screwed engagement between the casing 526 and the coupling member 530, and by removing the second container 520.

The cleaning tool 500 further includes not-illustrated lids that cover the application members 512 and 522, and that prevent drying of the tips 514a and 524a.

With the cleaning tool 500 constituted as described above, the user can clean the antireflection structure by applying the cleaning solution S1, which is impregnated in the applying portion 514, to the application target surface, i.e., the stained region of the antireflection structure, and by wiping off the cleaning solution S1 as appropriate. Furthermore, since the first container 510 containing the cleaning solution S1 and the second container 520 containing the removing solution S2 are coupled integrally with each other, the cleaning tool 500 is easy to carry with a hand in the operation, and operability is improved.

[Seventh Embodiment]

Figure 8:
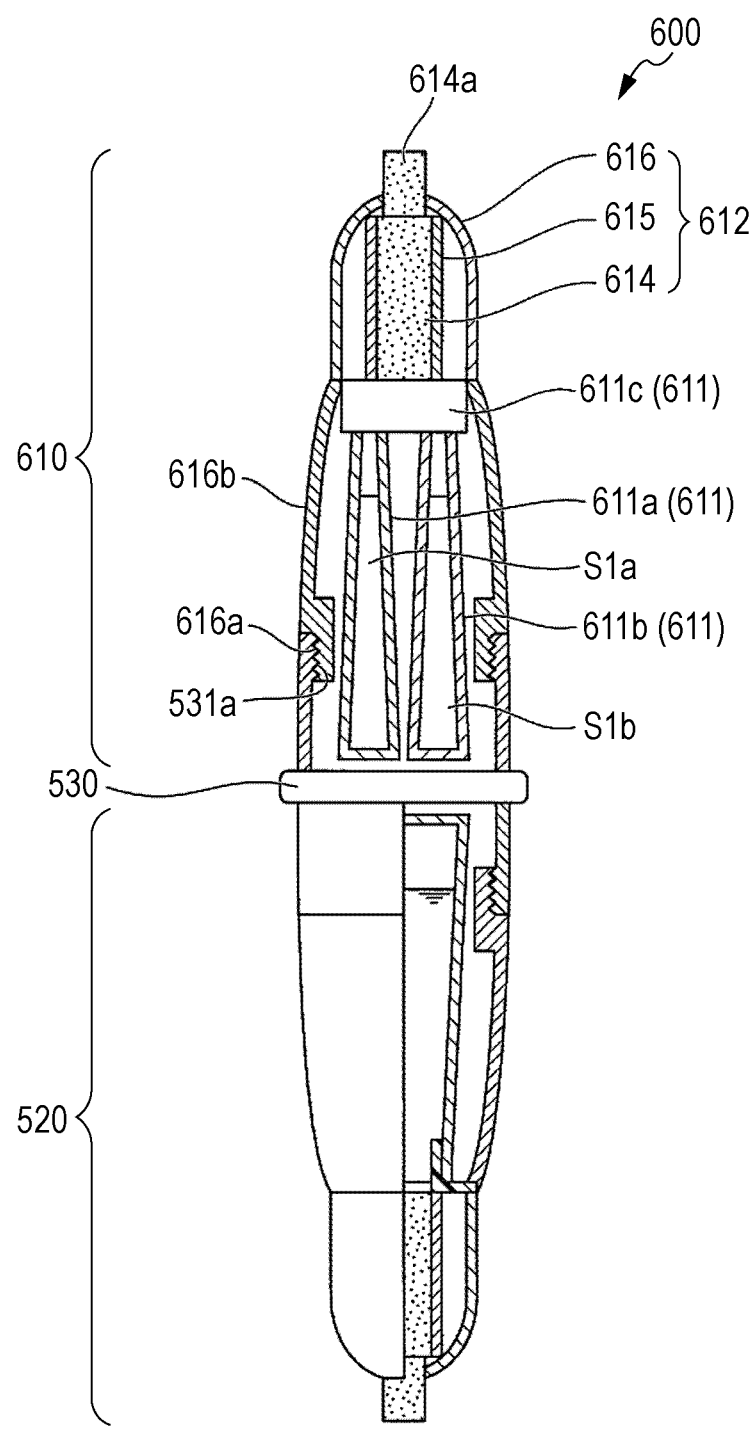
FIG. 8 illustrates, in a partially sectioned way, a cleaning tool according to a seventh embodiment of the present invention.

FIG. 8 illustrates, in a partially sectioned way, a cleaning tool 600 according to a seventh embodiment of the present invention. As illustrated in the drawing, the cleaning tool 600 according to this embodiment includes a first container 610 that contains the cleaning solution S1, and that allows the cleaning solution S1 to be applied to the desired position therefrom, and the second container 520 in the sixth embodiment, the first container 610 and the second container 520 being coupled integrally with each other through the coupling member 530.

The first container 610 in this embodiment includes a container body 611 that contains the cleaning solution S1, and an application member 612 that is connected to the container body 611, and that allows passage and discharge of the cleaning solution S1 therethrough from the interior of the container body 611.

The first container 610 in this embodiment contains two types of liquids (first liquid S1a and second liquid S1b) that can be prepared into the cleaning solution S1 when mixed together. The cleaning solution S1 can be prepared by mixing the first liquid S1a and the second liquid S1b together in the first container 610 before applying the cleaning solution S1.

The container body 611 includes a first cartridge 611a that contains the first liquid S1a, a second cartridge 611b that contains the second liquid S1b, and a tank 611c to which the first cartridge 611a and the second cartridge 611b are connected, and in which the first liquid S1a and second liquid S1b are mixed together.

The application member 612 includes an applying portion 614 that is disposed at one side of the tank 611c opposite to the side where the first cartridge 611a and the second cartridge 611b are connected to the tank 611c, a protective member 615 that covers the surroundings of the applying portion 614, and a cylindrical casing 616 that contains the above-mentioned components. The tank 611c is also contained in the casing 616. A not-illustrated opened portion is formed in the tank 611c at a connected portion between the tank 611c and the applying portion 614.

The applying portion 614 and the protective member 615 can be provided respectively in the same constitutions as those of the applying portion 514 and the protective member 515 in the sixth embodiment.

Male threads 616a are formed at the outer side of an end portion of the casing 616 on the side closer to the coupling member 530, and are screwed to female threads 531a formed in the coupling member 530. When the first liquid S1a inside the first cartridge 611a or the second liquid S1b inside the second cartridge 611b is exhausted, the first cartridge 611a or the second cartridge 611b can be replaced by loosening the screwed engagement between the casing 616 and the coupling member 530, and by removing the first container 610.

The casing 616, the first cartridge 611a, and the second cartridge 611b are each made of an organic material (resin material) and deformed upon a lateral portion 616b being pressed, whereby the first cartridge 611a or the second cartridge 611b in the casing 616 can be pressed. Thus, by pressing the casing 616, the first cartridge 611a and the second cartridge 611b are pressed and deformed, whereupon the first liquid S1a inside the first cartridge 611a and the second liquid S1b inside the second cartridge 611b can be supplied to the tank 611c. As a result, the first liquid S1a and the second liquid S1b can be mixed as appropriate in the tank 611c, and the cleaning solution S1 can be prepared.

The first liquid S1a and the second liquid S1b may be prepared, for example, as a combination in which the first liquid S1a is an aqueous solution of sodium hydrochlorite and the second liquid S1b is an aqueous solution of potassium bromide.

The cleaning tool 600 further includes a not-illustrated lid that covers the application member 612, and that prevents drying of the tip 614a.

With the cleaning tool 600 constituted as described above, the user can clean the antireflection structure by applying the cleaning solution S1, which is impregnated in the applying portion 614, to the application target surface, i.e., the stained region of the antireflection structure, and by wiping off the cleaning solution S1 as appropriate. Furthermore, since the first container 610 containing the cleaning solution S1 and the second container 620 containing the removing solution S2 are coupled integrally with each other, the cleaning tool 600 is easy to carry with a hand in the operation, and operability is improved.

Furthermore, even when detergency deteriorates with the lapse of time after mixing of the two liquids, a sufficient cleaning effect can be obtained because the cleaning solution S1 is prepared by mixing the two liquids when used.

[Eighth Embodiment]

Figure 9A:
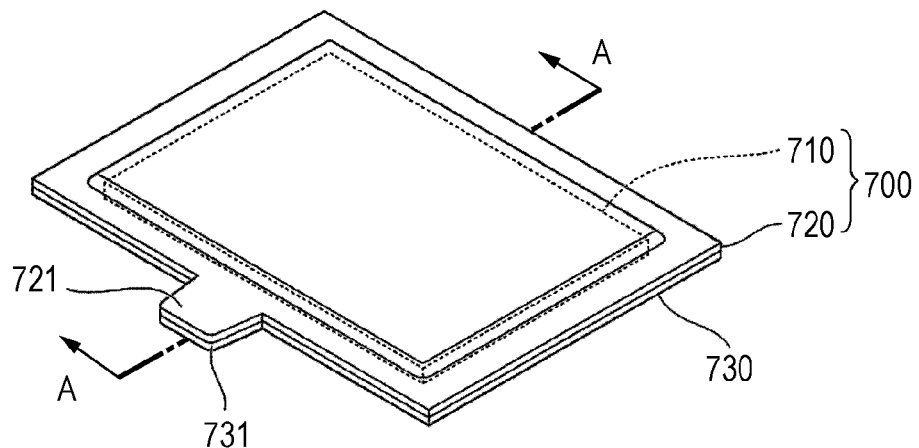
FIG. 9A is a schematic view of a cleaning tool according to an eighth embodiment of the present invention.
Figure 9B:
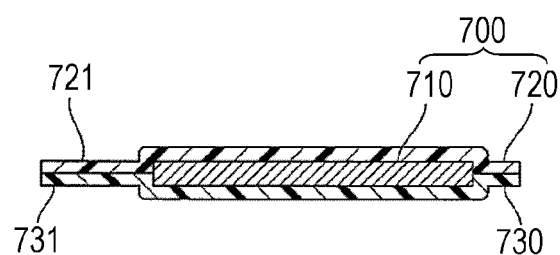
FIG. 9B is a sectional view of the cleaning tool according to the eighth embodiment of the present invention, the view being taken along a segment A-A in a direction denoted by arrow.
Figure 9C:
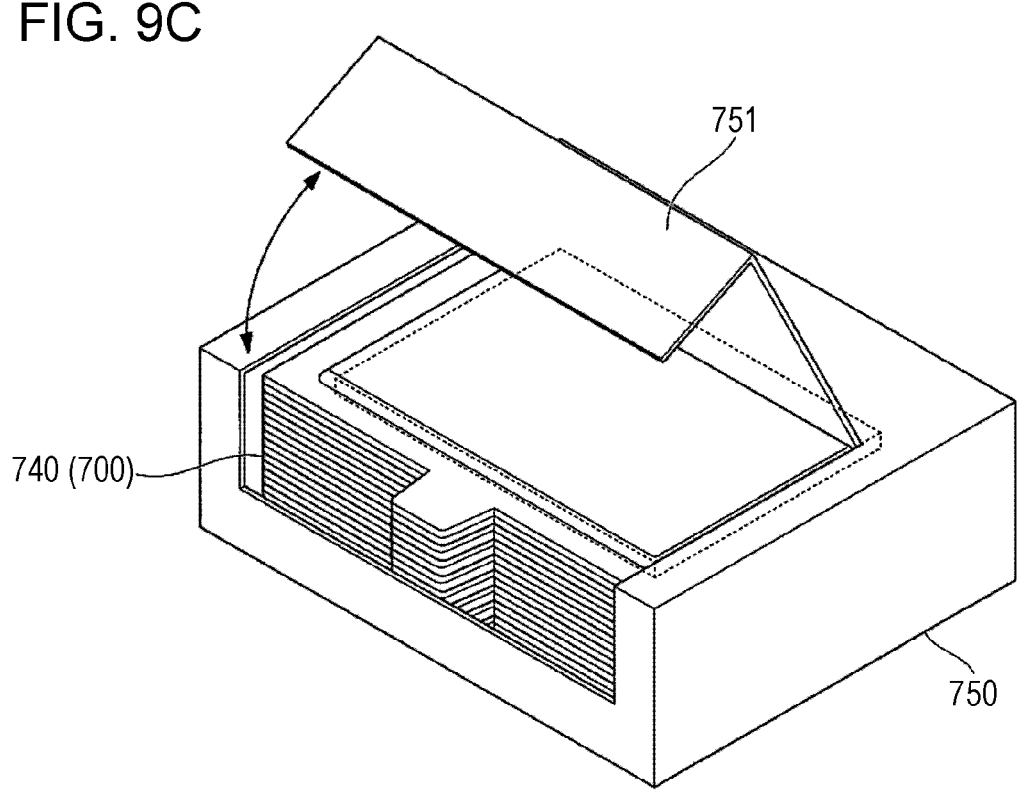
FIG. 9C is a perspective view illustrating one example of a stored state of the cleaning tool according to the eighth embodiment of the present invention.

FIGS. 9A to 9C are each a schematic view of a cleaning tool according to an eighth embodiment of the present invention. FIG. 9A is a perspective view of a cleaning tool 700 according to this embodiment, FIG. 9B is a sectional view of the cleaning tool 700, the view being taken along a segment A-A in FIG. 9A in a direction denoted by arrow, and FIG. 9C is a perspective view illustrating one example of a stored state of the cleaning tool 700.

As illustrated in FIGS. 9A and 9B, the cleaning tool 700 includes the above-described cleaning solution, a sheet-like base member 710 impregnated with the cleaning solution, and a holding film 720 that holds the base member 710. The cleaning tool 700 further includes a parting film 730 that holds the base member 710 between itself and the holding film 720.

The base member 710 is a sheet-like member formed by employing a resin-made porous material having many pores intercommunicating therein, such as a sponge-like material or a laminate of nonwoven fabric. The base member 710 is impregnated with the above-described cleaning solution in advance.

The holding film 720 serves not only to hold the base member 710, but also to make the user easily handle the base member 710 without directly touching the alkaline cleaning solution.

The parting film 730 holds the base member 710 between itself and the holding film 720, thereby suppressing evaporation or denaturation of the cleaning solution during storage. When the cleaning tool 700 is used, the parting film 730 is peeled off and taken away to expose the base member 710.

Tongues 721 and 731 for making the parting film 730 easily peeled off are formed in respective peripheral edges of the holding film 720 and the parting film 730 in shapes protruding outward. The tongues 721 and 731 are overlapped with each other in a plan view.

As illustrated in FIG. 9C, for example, the above-described cleaning tool 700 is preferably placed and stored in a storage container 750, which has a lid 751 capable of being opened and closed, in the form of a stack 740 including the plural cleaning tools 700 stacked one above the other.

In use of the cleaning tool 700 constituted as described above, after peeling off and taking away the parting film 730, the user sticks the exposed base member 710 onto the target surface to which the cleaning solution is applied, i.e., the stained region of the antireflection structure, together with the holding film 720. As a result, the cleaning solution S1 can be easily kept in contact with the stained region of the antireflection structure for a long time.

In trying to clean off the stain on the antireflection structure bonded to display surfaces of display devices, showcases, etc., when the cleaning solution is applied to the antireflection structure, the cleaning solution may drop because the planar direction of the antireflection structure is oriented vertically. Thus, a difficulty tends to occur in causing the cleaning solution to reach deep bottoms of the fine concavities of the antireflection structure. However, the cleaning tool 700 can make the cleaning solution more easily reach the deep bottoms of the fine concavities of the antireflection structure, and can realize effective cleaning with wiping-off of the cleaning solution.

After the use of the cleaning tool 700, preferably, the above-described removing solution is applied to the position at which the cleaning tool 700 has been stuck, by employing the second container 120 described in the second embodiment, for example, and the remaining cleaning solution is removed by wiping.

[Ninth Embodiment]

Figure 10A:
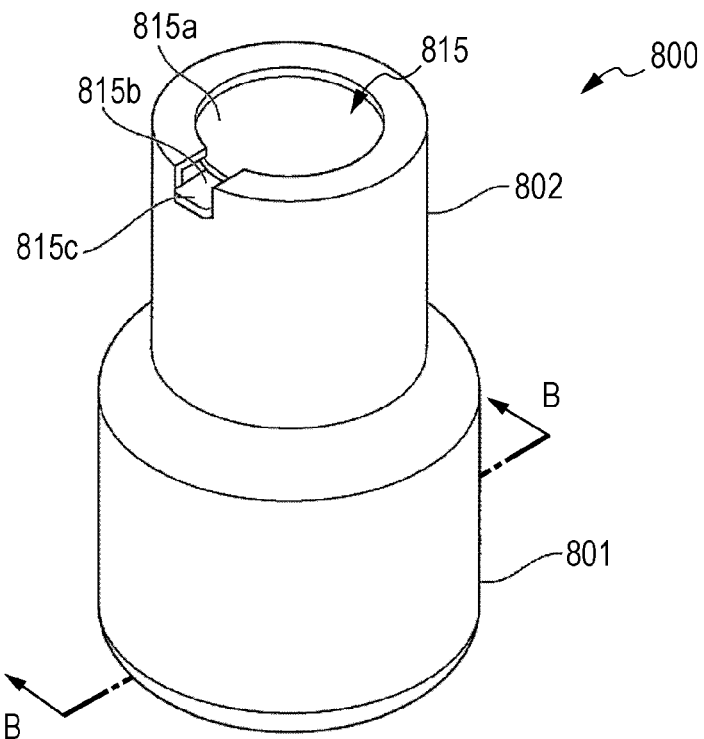
FIG. 10A is a perspective view of a cleaning tool according to a ninth embodiment of the present invention.
Figure 10B:
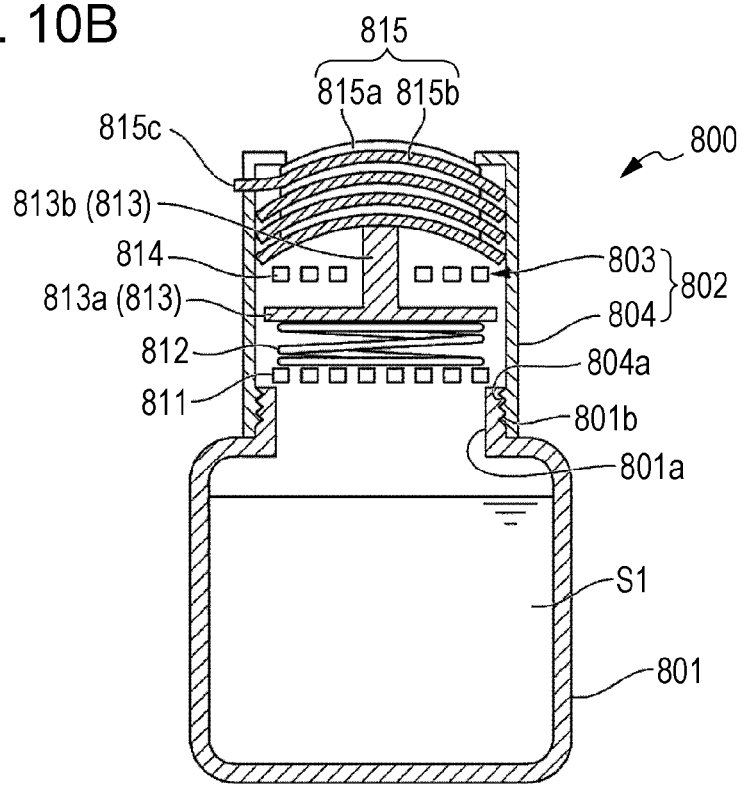
FIG. 10B is a sectional view of the cleaning tool according to the ninth embodiment of the present invention, the view being taken along a segment B-B in FIG. 10A in a direction denoted by arrow.

FIGS. 10A and 10B are each a schematic view of a cleaning tool according to a ninth embodiment of the present invention. FIG. 10A is a perspective view of a cleaning tool 800 according to this embodiment, and FIG. 10B is a sectional view of the cleaning tool 800, the view being taken along a segment B-B in FIG. 10A in a direction denoted by arrow.

As illustrated in FIGS. 10A and 10B, the cleaning tool 800 includes a container body 801 equipped with a bottom, which contains the cleaning solution S1, and which has an opened portion 801a through which the cleaning solution S1 is discharged, and an application member 802 that covers the opened portion 801a, and that allows passage and discharge of the cleaning solution S1 therethrough.

The application member 802 includes an applying portion 803 that allows passage of the cleaning solution S1 therethrough, and a holder 804 that holds the applying portion 803 to the container body 801. Male threads 801b are formed at the outer side of the opened portion 801a of the container body 801, and female threads 804a are formed at the inner side of the holder 804. The holder 804 is screwed to the opened portion 801a of the container body.

The applying portion 803 includes a net 811, a spring 812, an upward-pusher 813, a net 814, and an applying element 815, which are successively arranged in the mentioned order from the side close to the container body 801. The applying portion 803 including those components is contained inside the holder 804.

The upward-pusher 813 includes a plate-like member 813a arranged on the spring 812, and a shaft 812b protruding upward from the plate-like member 812a. The shaft 812b protrudes through a gap in the net 814 and comes into contact with the applying element 815. With the upward-pusher 813 being pushed upward by the spring 812, a distal end of the shaft 812b pushes up the applying element 815. Moreover, a rise of the plate-like member 813a of the upward-pusher 813 is restricted by the net 814, whereby an upper limit position of the upward-pusher 813 is set.

The applying element 815 includes the above-described cleaning solution, a sheet-like base member 815a impregnated with the cleaning solution, and a net-like or porous holding sheet 815b that holds the base member 815a. The base member 815a is formed by employing a similar material to that of the above-described base member 710. Thus, the cleaning solution S1 is impregnated into the base member 815a through the holding sheet 815b. In addition, a tongue 815c is formed in a peripheral edge of the holding sheet 815b in a shape protruding outward from the holder 804.

In the applying portion 803, the applying element 815 is stacked plural such that the base member 815a of the applying element 815 in the uppermost layer is exposed to the outside, and that the holding sheet 815b of the applying element 815 in the lowermost layer is pushed upward by the upward-pusher 813.

A holding portion 804b protruding toward a center axis is formed at an upper end of the holder 804. With the applying element 815 being pushed up by the upward-pusher 813, the applying element 815 is fixedly held in a state that a peripheral edge of the applying element 815 is pressed against the holding portion 804b.

With the cleaning tool 800 constituted as described above, the user can clean the antireflection structure by applying the cleaning solution S1 to the application target surface, i.e., the stained region of the antireflection structure, with the cleaning tool 800, and by wiping off the cleaning solution S1. Furthermore, when the base member 815a of the applying element 815 is stained, the base member 815a of another new applying element 815 can be exposed to the outside by grasping the tongue 815c of the old applying element 815 and peeling off it. Thus, the cleaning operation can be performed reliably.

After the use of the cleaning tool 800, preferably, the above-described removing solution is applied to the position at which the cleaning solution has been applied, by employing the second container 120 described in the second embodiment, for example, and the remaining cleaning solution is removed by wiping.

While the preferred embodiments of the present invention have been described above with reference to the accompanying drawings, it is needless to say that the present invention is not limited to those embodiments. The shapes, the combinations, etc. of the individual components, described in the above embodiments, are merely illustrative, and they can be variously modified in accordance with demands in design, etc. within the scope not departing from the gist of the present invention.

EXAMPLES

While the present invention will be described below in connection with reference to EXAMPLES, the present invention is not limited to the following EXAMPLES.

In EXAMPLES and COMPARATIVE EXAMPLES described below, cleaning was performed and removal of stains was evaluated in accordance with the following method.

[pH Measurement of Cleaning Solution]

A value measured using a pH meter (Model D-51 made by HORIBA, Ltd.) was obtained as the pH of the cleaning solution used in the evaluation. Also, a solution temperature displayed on the pH meter was obtained as the temperature of the cleaning solution during the measurement.

"1. Influence 1 of pH of Cleaning Solution"

Example 1

(Evaluation Sample 1)

An evaluation sample 1 was prepared by bonding an antireflection member (Motheye film), which was practically bonded to a display surface of a liquid crystal TV (Model LC-46XL9 made by Sharp Corporation), to a black acrylic plate at one surface of the antireflection member on the side opposite to the other surface where fine convexities (antireflection structure) were disposed.

(Evaluation Method 1)

A saliva stain was formed on the antireflection structure of the evaluation sample 1 by attaching saliva onto the evaluation sample 1, and by leaving the saliva to stand at an ordinary temperature for one day or longer for drying. The saliva permeated into concavities in the surface of the antireflection structure, and the saliva stain was formed upon drying of the saliva.

Then, a cotton-tipped stick impregnated with a cleaning solution 1 (stock solution of Progent (made by Menicon Co., Ltd., mixture of a sodium hydrochlorite solution and a potassium bromide solution) was slightly rubbed against the saliva stain on the sample, whereby the cleaning solution was applied. The antireflection film of the evaluation sample 1 was cleaned by wiping off the cleaning solution 1 remaining on the sample with a piece of unwoven fabric (Bemcot (Registered Trademark) M-311, made by Asahi Chemical Industry Co., Ltd.), and by further wiping the sample surface with a peace of unwoven fabric impregnated with water.

One cycle of cleaning was defined as a combination of the application of the cleaning solution 1, the wiping with the nonwoven fabric, and the wiping with the nonwoven fabric impregnated with water. When the stain was not removed by one cycle of cleaning, the cleaning was repeated until five cycles at maximum.

After the cleaning, a region where the saliva stain was attached was visually evaluated on change in degree of staining between before and after the cleaning.

(Evaluation Method 2)

A saliva stain was formed on the antireflection structure of the evaluation sample 1 by attaching saliva onto the sample, and by leaving the saliva to stand at an ordinary temperature for one day or longer for drying.

Then, a piece of nonwoven fabric impregnated with the cleaning solution 1 was stuck over the saliva stain and was left to stand for 5 minutes. After peeling off the nonwoven fabric, the cleaning solution 1 remaining on the sample was wiped off with a piece of unwoven fabric, and the sample surface was further wiped with a peace of unwoven fabric impregnated with water.

One cycle of cleaning was defined as a combination of the application of the cleaning solution 1, the wiping with the nonwoven fabric, and the wiping with the nonwoven fabric impregnated with water. When the stain was not removed by one cycle of cleaning, the cleaning was repeated until five cycles at maximum.

After the cleaning, a region where the saliva stain was attached was visually evaluated on change in degree of staining between before and after the cleaning.

Example 2

The evaluation was performed in the same manner as in EXAMPLE 1 except for using a cleaning solution 2 (aqueous solution of 0.5% by mass of Alkali Wash (sodium sesquicarbonate, made by Chinoshiosya Company Limited)) instead of the cleaning solution 1.

Example 3

The evaluation was performed in the same manner as in EXAMPLE 1 except for using a cleaning solution 3 (aqueous solution of 0.7% by mass of OxiClean (mixture of sodium percarbonate and sodium carbonate, made by Orange Glo Inc.)) instead of the cleaning solution 1.

Example 4

The evaluation was performed in the same manner as in EXAMPLE 1 except for using a cleaning solution 4 (aqueous solution, which was prepared by diluting a stock solution of Jpal (aqueous solution of sodium metasilicate, made by KUREHA TRADING Co., Ltd.)) with water in 100 time volume, instead of the cleaning solution 1.

Comparative Example 1

The evaluation was performed in the same manner as in EXAMPLE 1 except for using a cleaning solution A (stock solution of a liquid crystal panel cleaning solution (mixture of ethanol and pure water, made by Sharp Engineering Corporation)) for a liquid crystal TV AQUOS instead of the cleaning solution 1.

Comparative Example 2

The evaluation was performed in the same manner as in EXAMPLE 1 except for using a cleaning solution B (aqueous solution of 1% by mass of Qyuqyutto (surfactant, made by Kao Corporation)) instead of the cleaning solution 1.

Comparative Example 3

The evaluation was performed in the same manner as in EXAMPLE 1 except for using a cleaning solution C (stock solution of Proteoff (proteolytic enzyme, made by Menicon Co. Ltd.)) instead of the cleaning solution 1. The pH of the cleaning solution C was 5.56 at 23.7° C.

The evaluation results are listed in Table 1 given below. In Table 1, the result obtained with the above-described "evaluation method 1" is indicated in a column of "Evaluation 1", and the result obtained with the above-described "evaluation method 2" is indicated in a column of "Evaluation 2".

The evaluation results were rated as follows:
⊙: The stain remnant disappeared until the cleaning was repeated five cycles at maximum
○: The stain substantially disappeared with five cycles of the cleaning
Δ: The stain was reduced, but remained after five cycles of the cleaning
×: The stain was not changed even after five cycles of the cleaning

TABLE 1

| | pH | | | |
| | Measured Value | Solution Temperature During Measurement (° C.) | Evaluation 1 | Evaluation 2 |
| --- | --- | --- | --- | --- |
| EXAMPLE 1 | 11.50 | 25.0 | Δ | ⊙ |
| EXAMPLE 2 | 10.03 | 18.5 | Δ | Δ |
| EXAMPLE 3 | 11.42 | 18.9 | ○ | ○ |
| EXAMPLE 4 | 10.30 | 19.1 | Δ | Δ |
| COMPARATIVE EXAMPLE 1 | 7.25 | 16.4 | × | × |
| COMPARATIVE EXAMPLE 2 | 8.29 | 19.0 | × | × |
| COMPARATIVE EXAMPLE 3 | (not measured) | (not measured) | × | × |

As seen from the evaluation results, when the pH of the cleaning solution exceeds 10.00, removal of the stain can be confirmed, and concavities in the surface of the antireflection structure can be cleaned with removal of the stain.

Example 5

(Evaluation Sample 2)

An evaluation sample 2 was prepared by bonding an antireflection member similar to that in the evaluation sample 1 to a colorless and transparent glass.

The evaluation was performed in the same manner as in the "evaluation method 1" in EXAMPLE 1 except for using the evaluation sample 2 instead of the evaluation sample 1.

Example 6

The evaluation was performed in the same manner as in the "evaluation method 1" in EXAMPLE 2 except for using the evaluation sample 2 instead of the evaluation sample 1.

Example 7

The evaluation was performed in the same manner as in the "evaluation method 1" in EXAMPLE 3 except for using the evaluation sample 2 instead of the evaluation sample 1.

Example 8

The evaluation was performed in the same manner as in the "evaluation method 1" in EXAMPLE 4 except for using the evaluation sample 2 instead of the evaluation sample 1.

Comparative Example 4

The evaluation was performed in the same manner as in the "evaluation method 1" in COMPARATIVE EXAMPLE 1 except for using the evaluation sample 2 instead of the evaluation sample 1.

The evaluation results are listed in Table 2 given below. In Table 1, the result obtained with the above-described "evaluation method 1" is indicated in a column of "Evaluation 1". The evaluation results were rated in the same manner as in the case of Table 1.

TABLE 2

| | pH | | |
| | Measured Value | Solution Temperature During Measurement (° C.) | Evaluation 1 |
| --- | --- | --- | --- |
| EXAMPLE 5 | 11.50 | 25.0 | ○ |
| EXAMPLE 6 | 10.03 | 18.5 | ○ |
| EXAMPLE 7 | 11.42 | 18.9 | ○ |
| EXAMPLE 8 | 10.30 | 19.1 | ○ |
| COMPARATIVE EXAMPLE 4 | 7.25 | 16.4 | Δ |

As seen from the evaluation results, in EXAMPLES 5 to 8, the cleaning effect is higher and the saliva stain was removed more satisfactorily than in COMPARATIVE EXAMPLE 4. When the pH of the cleaning solution exceeds 10.00, removal of the stain can be confirmed, and concavities in the surface of the antireflection structure can be cleaned with removal of the stain.

"2. Effect of Cleaning with Combined Use of Removing Solution"

<2.1. Effect 1 of Cleaning with Use of Removing Solution>

(Evaluation Sample 3)

An evaluation sample 3 was prepared by employing an antireflection member having a narrower pitch (100 nm) between convexities than that used in the evaluation samples 1 and 2, and by bonding the antireflection member to a black acrylic plate at one surface of the antireflection member on the side opposite to the other surface on which fine convexities (antireflection structure) were formed.

Example 9

(Evaluation Method 3)

Hair wax stains were formed on the antireflection structure of the evaluation sample 3 by preparing hair wax (PERFECT HOLD WAX, SHORT HAIR HARD, made by Mandom Corporation) in a state sufficiently kneaded by a bare hand, attaching the hair wax onto the evaluation sample 1 at several locations not overlapping with each other, and by leaving the hair wax to stand at an ordinary temperature for one day or longer for drying.

A cleaning solution 5 was prepared as given below.

Cleaning solution 5: Aqueous solution of 0.1% by mass of nonionic surfactant, 0.5% by mass of alkanolamine and basic substance (sodium carbonate, sodium phosphate), and a pH adjuster functioning as a buffer solution. pH=10.78.

The hair wax stains formed as described above were wiped off slowly in one direction, while the cleaning solution 5 was applied to the hair wax stains, by employing a piece of nonwoven fabric (Savina made by KB SEIREN, LTD.) impregnated with the cleaning solution 5. The wiping using the unwoven fabric impregnated with the cleaning solution 5 was repeated five times at maximum.

Then, the antireflection film of the evaluation sample 3 was cleaned by slowly wiping a film surface, including a region where the cleaning solution had been applied, with a piece of nonwoven fabric (Savina made by KB SEIREN, LTD.) impregnated with a removing solution 1 (Aquos Cleaner, mixture of water and ethanol, made by Sharp Corporation).

After the cleaning, the locations where the hair wax stains were attached were visually evaluated on change in degree of staining between before and after the cleaning.

Comparative Example 5

The evaluation sample 3 was cleaned in the same manner as in EXAMPLE 9 except for not performing the wiping with the removing solution 1.

The evaluation results are listed in Table 3 given below. Unlike the evaluation in above "1. Influence 1 of pH of Cleaning Solution", the evaluation ratings were set as follows:
- ⊙: The stains completely disappeared within two repetitions of the wiping using the unwoven fabric impregnated with the cleaning solution (hereinafter referred to as the "wiping with the cleaning solution")
- ○: The stains completely disappeared with three to five repetitions of the wiping with the cleaning solution
- Δ: Contours of the stains remained, but the contours were partly wiped off after repeating the wiping with the cleaning solution five times
- ×: Contours of the stains clearly remained after repeating the wiping with the cleaning solution five times In the above evaluation ratings, "⊙" to "Δ" indicate that, when stains on, e.g., a display surface of a display device are cleaned, the stains can be removed to such an extent that the stains are not noticeable. Hence "⊙" to "Δ" were regarded as acceptable, and "×" was regarded as unacceptable.

Furthermore, in the above evaluation ratings, the wording "repeating the wiping five times", for example, implies that in the case of performing the wiping with the removing solution, the wiping with the removing solution is performed once after repeating the wiping with the cleaning solution five times, and that in the case of not performing the wiping with the removing solution, the wiping with the cleaning solution was just repeated five times.

TABLE 3

| | pH of Cleaning Solution | Evaluation Result |
|---|---|---|
| EXAMPLE 9 | 10.78 | ○ |
| COMPARATIVE EXAMPLE 5 | 10.78 | X |

As seen from the evaluation results, in EXAMPLE 9, the cleaning effect is higher and the hair wax stains are more satisfactorily removed than in COMPARATIVE EXAMPLE 5. Thus, the cleaning effect of the combined use of the removing solution 1 was confirmed.

Figure 11A:
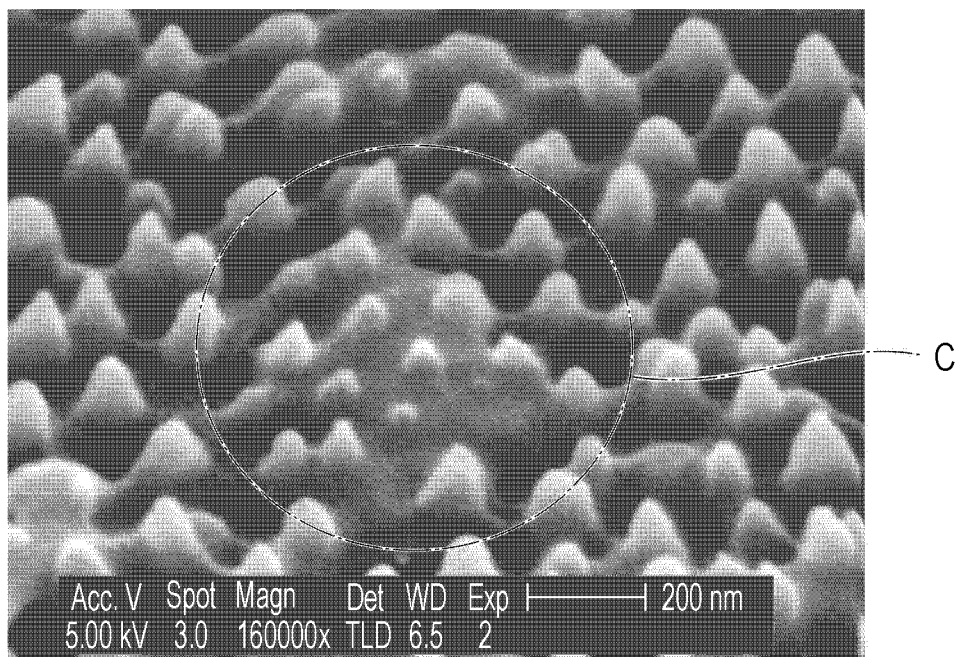
FIG. 11A is an electron microscope photograph representing the antireflection structure before cleaning in EXAMPLE.
Figure 11B:
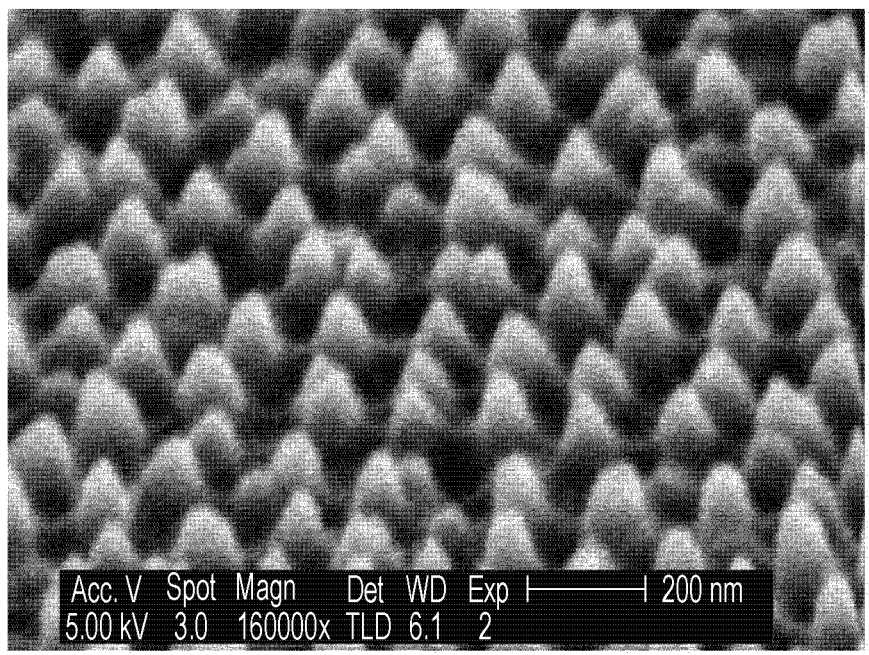
FIG. 11B is an electron microscope photograph representing the antireflection structure after the cleaning in EXAMPLE.

Moreover, as depicted in electron microscope photographs of FIGS. 11A and 11B, it was confirmed that, in EXAMPLE 9, the hair wax attached to the antireflection structure before the cleaning (FIG. 11A) was removed after the cleaning (FIG. 11B).

<2-2. Effect 2 of Cleaning with Use of Removing Solution (Reference Example)>

Reference Example 1

The evaluation sample 3 was cleaned in the same manner as in EXAMPLE 9 except for not performing the wiping with the cleaning solution 5.

Reference Example 2

The evaluation sample 3 was cleaned in the same manner as in EXAMPLE 9 except for not performing the wiping with the cleaning solution 5, and except for using a removing solution 2 (aqueous solution of 99.5% by mass of ethanol).

Reference Example 3

(Evaluation Sample 4)

An evaluation sample 4 was prepared by bonding a TAC film, not including fine convexities (antireflection structure), to a black acrylic plate instead of the antireflective member in the evaluation sample 3.

(Evaluation Method 4)

Hair wax stains were formed on a surface of the evaluation sample 4 in the same manner as in the evaluation method 3 except for using the evaluation sample 4.

The evaluation sample 4 was cleaned in the same manner as in REFERENCE EXAMPLE 1 except for using the evaluation sample 4 on which the hair wax stains were formed in accordance with the above-described method.

Reference Example 4

The evaluation sample 4 was cleaned in the same manner as in REFERENCE EXAMPLE 2 except for using the evaluation sample 4 on which the hair wax stains were formed in accordance with the above-described method.

The evaluation results are listed in Table 4 given below. The evaluation ratings were set as follows:

⊙: The stains completely disappeared within two repetitions of the wiping using the unwoven fabric impregnated with the removing solution ○: The stains completely disappeared with three to five repetitions of the wiping with the removing solution Δ: Contours of the stains remained, but the contours were partly wiped off after repeating the wiping with the removing solution five times ×: Contours of the stains clearly remained after repeating the wiping with the removing solution five times

TABLE 41

|  | Evaluation Result |
|---|---|
| REFERENCE EXAMPLE 1 | X |
| REFERENCE EXAMPLE 2 | X |
| REFERENCE EXAMPLE 3 | ⊙ |
| REFERENCE EXAMPLE 4 | ⊙ |

As seen from the evaluation results, the hair wax stains attached to a flat surface can be removed (REFERENCE EXAMPLES 3 and 4), but the hair wax stains attached to concavities in the surface of the antireflection structure cannot be removed with only the wiping using the removing solution. Thus, the cleaning effect of the combined use of the cleaning solution and the removing solution was confirmed.

<2-3. Influence 2 of pH of Cleaning Solution>

Cleaning solutions 6 to 11 given below were prepared.

Cleaning solution 6: Aqueous solution of 0.8% by mass of surfactant (nonionic surfactant, cationic surfactant), 0.5% by mass of alkanolamine and basic substance (sodium carbonate, sodium phosphate), and a pH adjuster. pH=10.80.

Cleaning solution 7: Prepared by diluting the cleaning solution 6 twice with pure water. Containing 0.25% by mass of basic substance. pH=10.62.

Cleaning solutions 8 to 13: Sodium carbonate was added to the cleaning solution 7 such that the concentration of the basic substance was adjusted to a value indicated in Table 5 given below.

TABLE 5

|  | Cleaning Solution 7 | Cleaning Solution 8 | Cleaning Solution 9 | Cleaning Solution 10 | Cleaning Solution 11 | Cleaning Solution 12 | Cleaning Solution 13 |
|---|---|---|---|---|---|---|---|
| Basic Substance (% by mass) | 0.25 | 0.5 | 0.75 | 1.0 | 1.5 | 2.0 | 5.0 |
| pH | 10.62 | 10.79 | 11.01 | 11.05 | 11.07 | 11.08 | 11.34 |

Example 10

The evaluation sample 3 was cleaned in the same manner as in EXAMPLE 9 except for using the cleaning solution 7 instead of the cleaning solution 5.

Example 11

The evaluation sample 3 was cleaned in the same manner as in EXAMPLE 9 except for using the cleaning solution 8 instead of the cleaning solution 5.

Example 12

The evaluation sample 3 was cleaned in the same manner as in EXAMPLE 9 except for using the cleaning solution 9 instead of the cleaning solution 5.

Example 13

The evaluation sample 3 was cleaned in the same manner as in EXAMPLE 9 except for using the cleaning solution 10 instead of the cleaning solution 5.

Example 14

The evaluation sample 3 was cleaned in the same manner as in EXAMPLE 9 except for using the cleaning solution 11 instead of the cleaning solution 5.

The evaluation results are listed in Table 6 given below. The evaluation results were rated on the basis of the same standards as those in Table 3.

TABLE 6

|  | pH of Cleaning Solution | Evaluation Result |
|---|---|---|
| EXAMPLE 10 | 10.62 | Δ |
| EXAMPLE 11 | 10.79 | ○ |
| EXAMPLE 12 | 11.01 | ○ |
| EXAMPLE 13 | 11.05 | ⊙ |
| EXAMPLE 14 | 11.07 | ⊙ |

As seen from the evaluation results, the cleaning effect is higher as the pH of the cleaning solution takes a higher value. Supposing that the satisfactory cleaning effect is to be obtained, the pH of the cleaning solution is preferably set to, for example, 10.70 or more.

Example 15

The cleaning solution 10 was put in a container having a 10-cm square shape. The evaluation sample 3 was placed in the cleaning solution with the antireflection structure of the evaluation sample immersed in the cleaning solution, and was left to stand for 38 hours.

A color tone on the basis of $a^*$ and $b^*$ in the CIE1976 ($L^*$, $a^*$, $b^*$) color space was measured for the evaluation sample 3 before and after the immersion by employing a spectrophotometer (Model V-560 made by JASCO Corporation.

Example 16

A color tone of the evaluation sample 3 was measured in the same manner as in EXAMPLE 15 except for using the cleaning solution 12.

Example 17

A color tone of the evaluation sample 3 was measured in the same manner as in EXAMPLE 15 except for using the cleaning solution 13.

The evaluation results are listed in Table 7 given below. In Table 7, "Chroma Difference" indicates a value expressed by the following formula (1).

(Chroma difference)=$\sqrt{\{(a^*\text{after immersion}-a^*\text{before immersion})^2+(b^*\text{after immersion}-b^*\text{before immersion})^2\}}$ (1)

TABLE 7

|  | pH of Cleaning Solution | Before Immersion a* | Before Immersion b* | After Immersion a* | After Immersion b* | Change Rate Change of a* | Change Rate Change of b* | Chroma Difference |
|---|---|---|---|---|---|---|---|---|
| EXAMPLE 15 | 11.05 | 0.234 | 0.311 | 0.243 | 0.331 | 104% | 106% | 0.0219 |
| EXAMPLE 16 | 11.08 | 0.196 | 0.331 | 0.210 | 0.346 | 107% | 105% | 0.0205 |
| EXAMPLE 17 | 11.34 | 0.124 | 0.178 | 0.178 | 0.254 | 144% | 143% | 0.0932 |

As seen from the evaluation results, if the pH of the cleaning solution is too high, there is a risk that the resin forming the antireflection structure would deteriorate and the color tone would degrade. Supposing that change of the color tone is to be suppressed, the pH of the cleaning solution is preferably set to, for example, 11.10 or less.

<2-4. Influence of Temperature of Cleaning Solution>

Example 18

The evaluation sample 3 was cleaned in the same manner as in EXAMPLE 9 by employing the cleaning solution 5 that was cooled down to 2° C. with ice water.

Example 19

The evaluation sample 3 was cleaned in the same manner as in EXAMPLE 9 by employing the cleaning solution 5 at the same temperature as a room temperature (17° C.)

Example 20

The evaluation sample 3 was cleaned in the same manner as in EXAMPLE 9 by employing the cleaning solution 5 that was heated to 25° C. with a hot plate.

Example 21

The evaluation sample 3 was cleaned in the same manner as in EXAMPLE 9 by employing the cleaning solution 5 that was heated to 40° C. with a hot plate.

Example 22

The evaluation sample 3 was cleaned in the same manner as in EXAMPLE 9 by employing the cleaning solution 5 that was heated to 55° C. with a hot plate.

The evaluation results are listed in Table 8 given below. The evaluation results were rated on the basis of the same standards as those in Table 3.

TABLE 8

|  | Temperature of Cleaning Solution | Evaluation Result |
|---|---|---|
| EXAMPLE 18 | 2° C. | X |
| EXAMPLE 19 | 17° C. | X |
| EXAMPLE 20 | 25° C. | Δ |
| EXAMPLE 21 | 40° C. | ○ |
| EXAMPLE 22 | 55° C. | Δ |

As seen from the evaluation results, the cleaning can be effectively performed at 25° C. or higher and 55° C. or lower. The cleaning can be more effectively performed at about 40° C.

<2-5. Effect of Surfactant>

Cleaning solutions 12 to 14 given below were prepared.

Cleaning solutions 12 to 14: Each solution was prepared by adding, to the cleaning solution 5 containing only an nonionic surfactant as the surfactant, a nonionic surfactant (NAROACTY CL-70 made by Sanyo Chemical Industries, Ltd.) such that the concentration of the nonionic surfactant was 0.8% by mass (cleaning solution 12), 1.0% by mass (cleaning solution 13), and 1.5% by mass (cleaning solution 14).

The pH of the cleaning solution was pH=10.83 (cleaning solution 12), pH=10.85 (cleaning solution 13), and pH=10.88 (cleaning solution 14).

Example 23

The evaluation sample 3 was cleaned in the same manner as in EXAMPLE 9.

Example 24

The evaluation sample 3 was cleaned in the same manner as in EXAMPLE 9 except for using the cleaning solution 12 instead of the cleaning solution 5.

Example 25

The evaluation sample 3 was cleaned in the same manner as in EXAMPLE 9 except for using the cleaning solution 13 instead of the cleaning solution 5.

Example 26

The evaluation sample 3 was cleaned in the same manner as in EXAMPLE 9 except for using the cleaning solution 14 instead of the cleaning solution 5.

The evaluation results are listed in Table 9 given below. The evaluation results were rated on the basis of the same standards as those in Table 3.

TABLE 9

| | pH of Cleaning Solution | Evaluation Result |
|---|---|---|
| EXAMPLE 23 | 10.78 | Δ |
| EXAMPLE 24 | 10.83 | Δ |
| EXAMPLE 25 | 10.85 | ○ |
| EXAMPLE 26 | 10.88 | ○ |

As seen from the evaluation results, the cleaning can be more effectively performed at a higher concentration of the nonionic surfactant when the pH of the cleaning solution is almost the same.

Example 27

The evaluation sample 3 was cleaned in the same manner as in EXAMPLE 9 except for using the cleaning solution 6 instead of the cleaning solution 5.

Example 28

The evaluation sample 3 was cleaned in the same manner as in EXAMPLE 24.

The evaluation results are listed in Table 10 given below. The evaluation results were rated on the basis of the same standards as those in Table 3.

TABLE 10

| | Surfactant (Concentration of 0.8% by mass) | Evaluation Result |
|---|---|---|
| EXAMPLE 27 | nonionic surfactant + anionic surfactant | ○ |
| EXAMPLE 28 | nonionic surfactant | Δ |

As seen from the evaluation results, with the combined use of the nonionic surfactant and the anionic surfactant, the cleaning can be more effectively performed in the case using only the nonionic surfactant when the concentration of the surfactant is the same.

<2-6. Influence of Wiping Member>

The wiping members were prepared as follows.

Wiping member 1: Savina MX (made by KB SEIREN, LTD.). Fibers having uniform thickness with fiber diameters of 3 μm to 4 μm.

Wiping member 2: Nanocloth (made by TEIJIN FIBERS LIMITED). Bundles of fibers with fiber diameters of 15 μm to 17 μm and bundles of fibers with fiber diameters of 0.5 μm to 0.7 μm are mixed.

Wiping member 3: TRAYSEE (made by TORAY INDUSTRIES INC.). Bundles of fibers with a fiber diameter of 15 μm and bundles of fibers with fiber diameters of 3 μm to 6 μm are mixed.

Wiping member 4: Belima X (made by KB SEIREN, LTD.). A mass of 1.5-mm square is formed by bundles of fibers with fiber diameters of 5 μm to 6 μm.

Wiping member 5: Cotton handkerchief (made by MILLION FIBERS LIMITED). A mesh of 0.5-mm square is formed by bundles of fibers with fiber diameters of 10 μm to 15 μm.

Wiping member 6: Tissue paper (Kleenex, made by NIPPON PAPER CRECIA Co., LTD.). Fibers with fiber diameters of 5 μm to 20 μm are aggregated.

Wiping member 7: Alcohol wetted tissue (Scotty, made by NIPPON PAPER CRECIA Co., LTD.). Fibers with fiber diameters of 6 μm to 30 μm are aggregated.

The "fiber diameter" of each wiping member was determined by taking an image of the wiping member with a scanning electron microscope (SEM. made by Phillips), and measuring the fiber diameter from a taken microscope photograph.

(Evaluation Method 5)

The wiping member was attached to a surface nature measurement apparatus (TRIBOGEAR TYPE: 14 FW), and was reciprocated to be rubbed against the evaluation sample 3 at the side where the antireflective structure was formed. The presence of flaws in the rubbed region was visually evaluated.

Evaluation conditions were set to a load of 500 g, a stroke of 30 mm, and a speed of 2400 mm/min (40 reciprocating motions/min).

When the position of the wiping member was moved back and forth by the measurement apparatus, the number of reciprocating motion was counted as one. The visual evaluation was performed by stopping the measurement apparatus each time the number of reciprocating motions reached 10, 50, 100, 500, and 1000.

The evaluation results are listed in Table 11 given below. The evaluation results were rated as follows:

○: No flaws were found even when light was cast directly onto the sample in a dark room Δ: Flaws were found when light was cast directly onto the sample, but no flaws were found in an atmosphere where light was not cast directly onto the sample ×: Flaws were found even when light was not cast directly onto the sample Here, the wording "light was cast" implies that light is obliquely applied to the surface of the evaluation sample 3 at the side including the antireflective member. The presence of flaws is evaluated by visually observing the reflected light. When relatively large flaws are present in the antireflective member, the flaws can be visually recognized with ease because the reflected light is scattered by the flaws.

TABLE 11

| | | Number of Reciprocating Motions | | | | |
|---|---|---|---|---|---|---|
| | Fiber Diameter | 10 | 50 | 100 | 500 | 1000 |
| Scraping Member 1 | 3-4 μm | ○ | ○ | ○ | — | ○ |
| Scraping Member 2 | ① 15-17 μm ② 0.5-0.7 μm | ○ | ○ | ○ | Δ-X | X |
| Scraping Member 3 | ① 15 μm ② 3-6 μm | ○ | ○ | ○ | ○ | ○ |
| Scraping Member 4 | 5-6 μm | ○ | ○ | ○ | Δ-X | X |
| Scraping Member 5 | 10-15 μm | ○ | Δ | X | X | X |
| Scraping Member 6 | 5-20 μm | Δ | Δ | Δ | — | X |
| Scraping Member 7 | 6-30 μm | X | X | X | X | X |

("—": not evaluated)

As seen from the evaluation results, no flaws are generated in the wiping members 1 to 4, which include the fibers with the diameters of 7 μm or less without including the fibers with the diameters of 20 μm or more, even after reciprocating each of the wiping members 100 times. Thus, those wiping members are suitable for the wiping in the operation of cleaning the antireflective member.

From the results described above, the following fact was confirmed. The cleaning solution is able to satisfactorily clean stains attached to fine concave-convex irregularities formed at a period that is controlled to be equal to or shorter than the wavelength of visible light.

REFERENCE SIGNS LIST

1 . . . antireflective member, 2 . . . base member, 3 . . . convexity (antireflective structure), 100, 200, 300, 400, 500, 600, 700, 800 . . . cleaning tools, 111, 121, 211, 311, 411, 611, 801 . . . container bodies, 111a, 121a, 311a, 411a, 511a, 521a, 801a . . . opened portions, 112, 122, 212, 312, 412, 512, 522, 612, 802. . . application members, 113, 415, 514, 524, 614, 803, 815 . . . applying portions, 511 . . . cartridge (container body), P . . . period, S1 . . . cleaning solution.

The invention claimed is:

1. A cleaning method for cleaning a concavity, the concavity being a region between adjacent two of a plurality of convexities of an antireflective structure, the antireflective structure being transparent, the antireflective structure having the plurality of convexities on one surface of the antireflective structure, the plurality of convexities being formed at a period equal to or shorter than a wavelength in a visible light range, the antireflective structure preventing, at the one surface, reflection of light entering the one surface, the cleaning method comprising:
using a cleaning solution having a pH of 10.00 or more, the cleaning solution including a buffer,
wherein a height of each of the plurality of convexities is 100 nm or more and 600 nm or less, and
a maximum value of a width of a bottom surface of the plurality of convexities, when looked at in a plan view, is 100 nm or more and 600 nm or less.

2. The cleaning method according to claim 1, wherein the cleaning solution contains a surfactant.

3. The cleaning method according to claim 2, wherein the surfactant contains a nonionic surfactant, and
a concentration of the nonionic surfactant is 0.1% by mass or more and 10% by mass or less.

4. The cleaning method according to claim 3, wherein the concentration of the nonionic surfactant is 1.0% by mass or more and 5.0% by mass or less.

5. The cleaning method according to claim 2, wherein the surfactant contains an anionic surfactant.

6. The cleaning method according to claim 1, wherein the pH of the cleaning solution is 10.70 or more and 11.10 or less.

7. The cleaning method according to claim 1, wherein each of the plurality of convexities has a cone-shape with a width of a bottom surface and a height, the height being greater than the width.

8. The cleaning method according to claim 7, wherein the plurality of convexities formed of a resin are used.

9. The cleaning method according to claim 8, wherein an ultraviolet-curing acrylic resin is used as the plurality of convexities.

10. The cleaning method according to claim 1, further comprising:
using, after the cleaning of the concavity, a removing solution, the removing solution being one of pure water, alcohol, acetone, and a mixture of at least two of the pure water, alcohol, and acetone.

11. A cleaning solution used for cleaning a concavity, the concavity being a region between adjacent two of a plurality of convexities of an antireflective structure, the antireflective structure being transparent, the antireflective structure having the plurality of convexities on one surface of the antireflective structure, the plurality of convexities being formed at a period equal to or shorter than a wavelength in a visible light range, the antireflective structure preventing, at the one surface, reflection of light entering the one surface, the cleaning solution comprising:
a buffer, wherein
the cleaning solution has a pH of 10.00 or more,
a height of each of the plurality of convexities is 100 nm or more and 600 nm or less, and
a maximum value of a width of a bottom surface of the plurality of convexities, when looked at in a plan view, is 100 nm or more and 600 nm or less.

* * * * *